United States Patent [19]
Cobbs et al.

[11] Patent Number: 5,396,599
[45] Date of Patent: Mar. 7, 1995

[54] COMPUTER SYSTEM WITH A BUS CONTROLLER

[75] Inventors: David Cobbs, Marlboro; Stephen R. Williams, Jamaica Plain, both of Mass.

[73] Assignee: NEC Electronics, Inc., Mountain View, Calif.

[21] Appl. No.: 464,838

[22] Filed: Jan. 16, 1990

[51] Int. Cl.⁶ .................................................. G06F 9/00
[52] U.S. Cl. ...................................... 395/325; 395/775
[58] Field of Search ............... 395/325, 775, 550, 425, 395/250, 200

[56] References Cited

U.S. PATENT DOCUMENTS

| | | | |
|---|---|---|---|
| 4,641,237 | 2/1987 | Yabushita et al. | 395/200 |
| 4,661,905 | 4/1987 | Bamba et al. | 395/325 |
| 4,802,120 | 1/1989 | McCoy | 395/550 |
| 4,821,174 | 4/1989 | Webb et al. | 395/325 |
| 4,922,409 | 5/1990 | Schoellkopf | 395/325 |
| 5,045,998 | 9/1991 | Begun et al. | 395/325 |
| 5,068,785 | 11/1991 | Sugiyama | 395/325 |
| 5,097,437 | 3/1992 | Larson | 395/775 |
| 5,148,525 | 9/1992 | Ohga et al. | 395/250 |
| 5,148,539 | 9/1992 | Enomoto et al. | 395/425 |

OTHER PUBLICATIONS

μPD71621 Clock Pulse Generator/Drive; Data Sheet, NEC Corporation 1988; Feb. 1989P, IC-7621A.
μPB8224 Clock Generator and Driver for 8080A Processors; NEC Electronics U.S.A., Inc.; pp. 595–599.
μPD71611 CMOS Clock Generator Advanced Product Information Data Sheet, NEC Electronics, Inc.; Mar., 1987; pp. 1–11.
82188 Integrated Bus Controller For iAPX 86, 88, 186, 188 Processors, Intel, Nov. 1984, pp. 3-257 through 3-267.
82288 Bus Controller For iAPX 286 Processors, Intel, Jan., 1985; pp. 4-100 through 4-111.
386 ™ Microprocessor Hardware Reference Manual, Intel Corporation, 1988; pp. 6-6, 6-7 and A-1 through A-12.
μPD70136 (V33) 16–Bit Microprocessor: High-Speed, CMOS NEC Electronics Inc., Sep. 1989.

*Primary Examiner*—Michael R. Fleming
*Assistant Examiner*—Tariq R. Hafiz
*Attorney, Agent, or Firm*—Skjerven, Morrill, MacPherson, Franklin & Friel

[57] ABSTRACT

A programmable digital circuit is provided for bus control of a fast microprocessor such as a V33 microprocessor. The digital circuit includes a bus controller, a wait state controller and a clock generator generating a processor clock and a system clock with but a small skew between them.

4 Claims, 41 Drawing Sheets

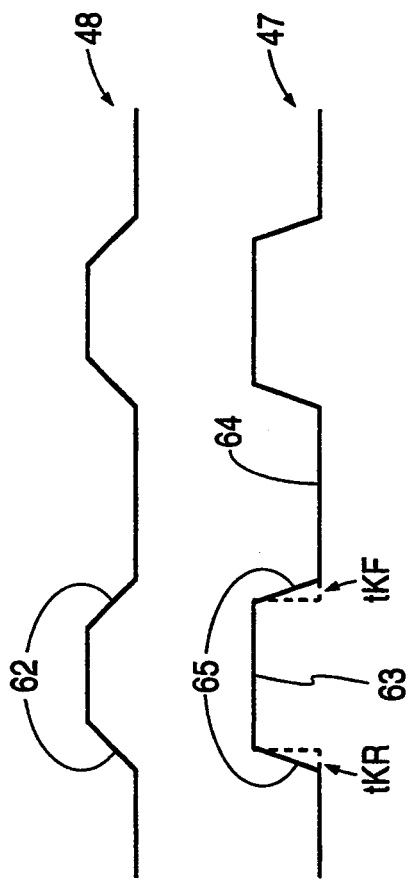
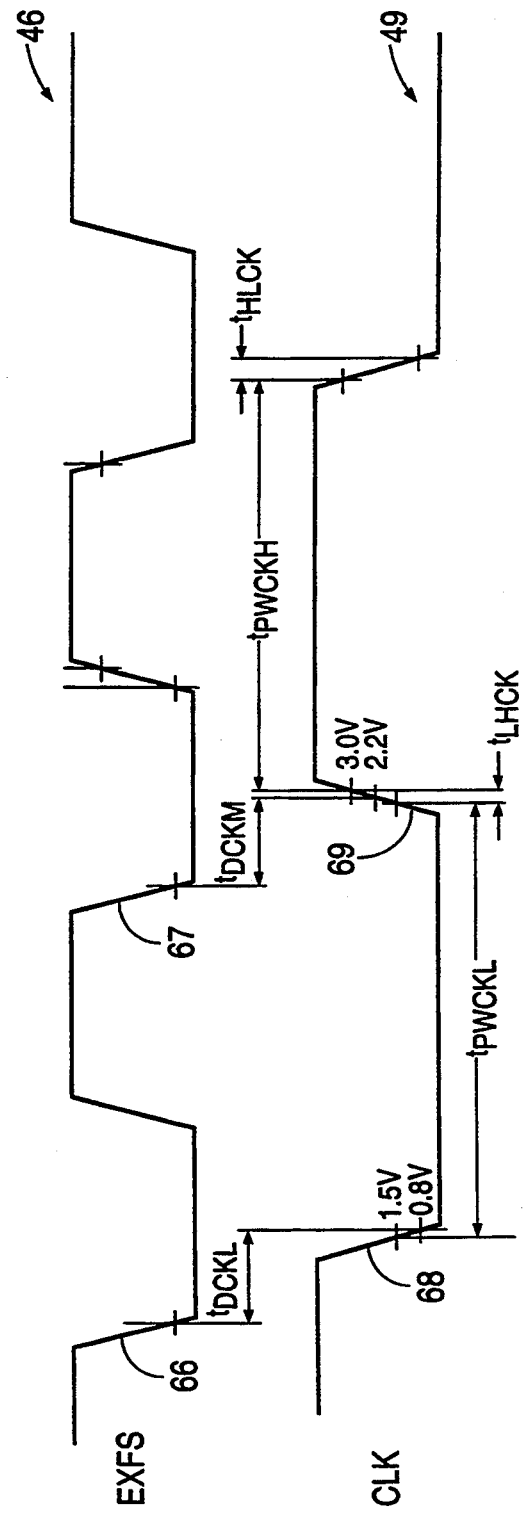
FIG. 3A (PRIOR ART)
FIG. 3B (PRIOR ART)
FIG. 3C (PRIOR ART)
FIG. 3D (PRIOR ART)

FIG. 8A
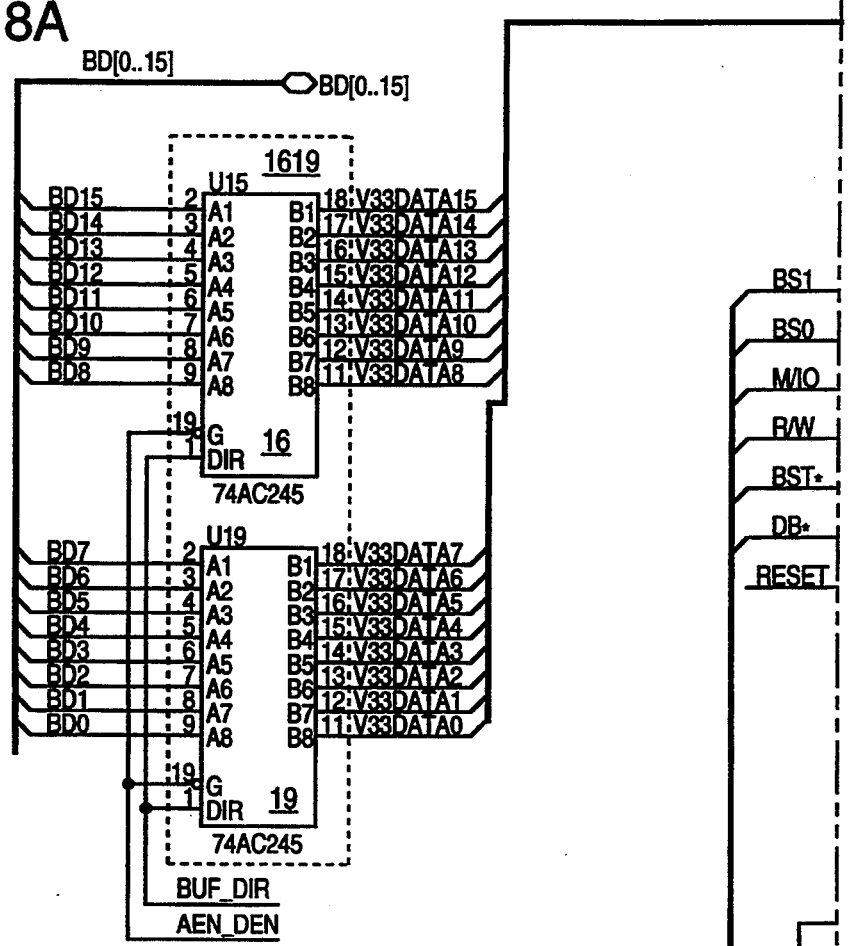
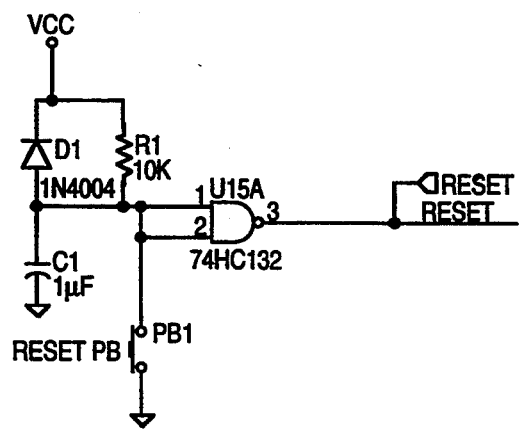

KEY TO FIG. 8

| FIG. 8A | FIG. 8B | FIG. 8C |
|---------|---------|---------|
| FIG. 8D | FIG. 8E |         |

KEY TO FIG. 9

| FIG. 9A | FIG. 9B | FIG. 9C |
|---|---|---|
| FIG. 9D | FIG. 9E | FIG. 9F |

FIG. 10C

KEY TO
FIG. 10

| FIG. 10A | FIG. 10B | FIG. 10C |
|----------|----------|----------|

Module _Control2

Flag '-r3','-s', '-KY','-f','-v'

Title
'V33 Bus Controller
V-Series Applications Engineering Group
NEC Electronics, 1 Natick Exec. Pk., Natick MA 01760'

TControl        Device 'P16V8R';

" This 2nd version of the control PAL has three major changes from the 1st
" version. First, IORD/WR are delayed by a clock to allow more IO address
" decode time. Second, IORD/WR are asserted during CP read/write cycles to
" provide the 'hooks' for an 80287 interface PAL. Lastly, the buffer enable
" signal is kept inactive during CP operations.

"Pins Declarations:

"Inputs

| !BCYST | pin 2; |
|---|---|
| BS1, BS0 | pin 4,3; |
| Mem | pin 5; |
| Read | pin 6; |
| CLK | pin 7; |
| !READY | pin 8; |
| RESET | pin 9; |
| CLK2 | pin 1; |
| !OE | pin 11; |

"Outputs

| ST1, ST0 | pin 14,13; |
|---|---|
| !IMRD, !MWR | pin 15,16; |
| !IORD, !IOWR | pin 17,18; |
| !INTAK | pin 12; |
| !ADR_DAT | pin 19; |

"Constant Declaration:

| IO | = !Mem; |
|---|---|
| Write | = !Read; |
| Cycle_Start | = BCYST & CLK; |

"Mem_Read includes Prefetch, Memory and Coprocessor Data operations
    Mem_Read   =   Mem & Read & !(BS1 & BS0);

FIG. 11A

"Mem_Write Includes Memory and Coprocessor Data operations
    Mem_Write    = Mem & Write & ((!BS1 & BS0) # (BS1 & !BS0));

"IO_Read includes IO and direct coprocessor operations
    IO_Read    = IO & Read & ((!BS1 & BS0) # (BS1 & !BS0));

"Interrupt acknowledge
    INTack    = IO & Read & !BS1 & !BS0;

"IO_Write includes I/O and direct coprocessor operations
    IO_Write    = IO & Write & ((!BS1 & BS0) # (BS1 & !BS0));
    CP_op    = IO & BS1 & !BS0;
    Halt    = IO & Write & BS1 & BS0;
    Inactive    = Mem & Write & BS1 & BS0;
    Illegal    = (Mem & Read & BS1 & BS0
                        # Mem & Write & !BS1 & !BS0
                        # IO & Read & BS1 & BS0
                        # IO & Write & !BS1 & !BS0);
    CP_Read    = IO & Read & BS1 & !BS0;
    CP_Write    = IO & Write & BS1 & !BS0;
    S0    = !ST1 & !ST0;
    S1    = !ST1 & ST0;
    S2    = ST1 & ST0;
    S3    = ST1 & !ST0;

ON, OFF    = 1, 0;
    x,X,L,H, PH, PL = .X.,.X., 0, 1, .C., .K.; "PH, PL means Pulse High, Low "Bus Interface State Machine Definition:

"State assignments. State numbers have been chosen to make state
"transitions use only a single bit change in the state number.

Idle    = 0;
    State1    = 1;
    State2    = 3;
    State3    = 2;

State_Diagram [ST1, ST0]

"Idle State:Waits for a bus cycle to start (BCYST asserted during CLK high,
"with a valid bus cycle code). ADR_DAT is high so that the address latch is
"open and the data buffer is closed."

FIG. 11B

State idle:

IF RESET THEN State1
ELSE IF Cycle_Start & (Mem_Read # Mem_Write # IO_Read # IO_Write # INTack)
    THEN State1
    ELSE Idle;

"During State 1, strobes are asserted, and ADR_DAT is driven low for write
"cycles, thereby closing the address latch and enabling the data buffer.
"READY is sampled.

"The state machine will stay in state 1 until READY is seen. READY is only
"sampled when the V33 clock is low, because that is when the V33 samples
"READY. If READY were not qualified with CLK low, and READY was "asserted early, then the state machine could get out of step with the V33 by
"entering state 2 before the V33 has seen READY.

State State1:

IF RESET THEN idle
        ELSE IF (READY & !CLK) THEN State2
            ELSE State1;

"During State 2, strobes remain asserted, ADR_DAT is low so that address
"latch is closed and data buffer is enabled. A transition to State 3 is always
"made.

State State2:

IF RESET THEN Idle
        ELSE State3;

"During State 3, strobes remain asserted, and this is the final state of the bus
"cycle. After state 3 (during Idle), all strobes are deasserted, and the address
"latch is opened by driving ADR_DAT low.

State State3:

GOTO Idle;

FIG. 11C

"Note that because outputs are clocked, they are not active until the state after
"the one that starts them. For example, ADR_DAT has a term that will assert it
"if the current state is 1, but the effect of this term will not be seen until state 2

"Output Equations:

Equations

"INTAK Output:

"During interrupt acknowledge cycles, an external interrupt controller, such as
"uPD71059, supplies a vector. INTAK is a special form of IO read that is used
"by a uPD71059 to enable its vector output.

```
INTAK:=   S0 & Cycle_Start & INTack & !RESET
      #   S1 & INTAK & !RESET
      #   S2 & INTAK & !RESET;
```

"ADR_DAT Output;

"ADR_DAT serve two purposes. First, it is tied to the enable inputs of the
"address latches, so that when it is high, the latch is open, and when it is low
"the latch is closed. This signal is also tied to the enable inputs of the data
"bus buffers, so that they are enabled whenever the address latch is closed,
"and off if the latch is open. That is, ADR_DAT is high during idle to latch the
"address, and low during the actual bus cycle to enable the data buffers.

"ADR_DAT is driven low during states 1,2,3 for write cycles. For reads, the
"buffer must be off for the first state 1 to allow the V33 to float its data bus
"outputs, but ADR_DAT is low for all subsequent state 1's (more could be
"added if READY is used) and during states 2 and 3.

```
ADR_DAT :=   S0 & Cycle_Start & Write & !(BS1 & BS0) & !RESET & !CP_op
         #   S1 & !RESET&!CP_op
         #   S2 & !RESET&!CP_op;
```

"MRD Output;

"Memory ReaD is asserted during states 1,2,3. It will be asserted following the
"start of a memory read cycle in state 0. Once it is asserted, it will stay
"asserted until after state 3.

FIG. 11D

MRD  :=  S0 & Cycle_Start & Mem_Read & !RESET
     #   S1 & MRD & !RESET
     #   S2 & MRD & !RESET;

"MWR Output:

"Memory WRite is asserted during states 1,2. It will be asserted following the
"start of a memory write cycle in state 0. Once it is asserted, it will stay
"asserted until after state 2.

MWR  :=  S0 & Cycle_Start & Mem_Write & !RESET
     #   S1 & MWR & !RESET;

"IORD Output;

"IO ReaD is asserted during states 1,2,3. It will be asserted following the start
"of an IO read cycle in state 0. Once it is asserted, it will stay asserted until
"after state 3

IORD :=  S0 & Cycle_Start & IO_Read & !RESET
     #   S1 & IORD & !RESET
     #   S2 & IORD & !RESET;

"IOWR Output:

"IO WRite is asserted during cycle states 1,2,3. It will be asserted following the
"start of an IO write cycle in state 0. Once it is asserted, it will stay asserted
"until after the last state 2.

IOWR :=  S0 & Cycle_Start & IO_Write & !RESET
     #   S1 & IOWR & !RESET;

Test_Vectors ([Mem, BS1, BS0, Read, BCYST, CLK, READY, RESET, CLK2]
    -> [ST1, ST0, INTAK, ADR_DAT, MRD, MWR, IORD, IOWR])

[X,X,X,X,X,X,X,H,PH]  -> [0,0,L,L,L,L,L,L]; "RESET

"MEMORY READ CYCLE

[H,0,1,H,L,L,L,L,PH]  -> [0,0,L,L,L,L,L,L]; "MEM READ

FIG. 11E

[H,0,1,H,H,H,L,L,PH] -> [0,1,L,L,H,L,L,L]; "START? (YES)
[H,0,1,L,H,L,L,L,PH] -> [0,1,L,H,H,L,L,L]; "S1, IGNORE WRITE CYCLE
[H,0,1,L,H,H,L,L,PH] -> [0,1,L,H,H,L,L,L]; "S1, WAIT FOR READY
[H,0,1,L,H,L,L,L,PH] -> [0,1,L,H,H,L,L,L]; "S1, WAIT FOR READY
[H,0,1,L,H,H,H,L,PH] -> [0,1,L,H,H,L,L,L]; "S1, WAIT FOR CLK LOW
[H,0,1,L,H,L,H,L,PH] -> [1,1,L,H,H,L,L,L]; "GOT RDY, GOTO S2
[H,0,1,L,H,H,L,L,PH] -> [1,0,L,H,H,L,L,L]; "GOTO S3
[H,0,1,L,H,L,L,L,PH] -> [0,0,L,L,L,L,L,L]; "GOTO IDLE

"MEMORY WRITE CYCLE

[H,0,1,L,H,L,L,L,PH] -> [0,0,L,L,L,L,L,L]; "WAIT FOR CLK HIGH
[H,0,1,L,H,H,L,L,PH] -> [0,1,L,H,L,H,L,L]; "BEGIN WRITE CYCLE
[L,0,1,H,H,L,L,L,PH] -> [0,1,L,H,L,H,L,L]; "S1, IGNORE IO CYCLE
[L,0,1,H,H,H,L,L,PH] -> [0,1,L,H,L,H,L,L]; "S1, WAIT FOR READY
[L,0,1,H,H,L,L,L,PH] -> [0,1,L,H,L,H,L,L]; "S1, WAIT FOR READY
[L,0,1,H,H,H,H,L,PH] -> [0,1,L,H,L,H,L,L]; "S1, WAIT FOR CLK LOW
[L,0,1,H,H,L,H,L,PH] -> [1,1,L,H,L,H,L,L]; "GOT RDY, GOTO S2
[L,0,1,H,H,H,L,L,PH] -> [1,0,L,H,L,L,L,L]; "GOTO S3
[L,0,1,H,H,L,H,L,PH] -> [0,0,L,L,L,L,L,L]; "GOTO IDLE

"IO READ CYCLE

[L,0,1,H,H,L,L,L,PH] -> [0,0,L,L,L,L,L,L]; "WAIT FOR CLK HIGH
[L,0,1,H,H,H,L,L,PH] -> [0,1,L,L,L,L,H,L]; "BEGIN IO READ
[L,0,1,L,H,L,H,L,PH] -> [1,1,L,H,L,L,H,L]; "S2
[L,0,1,H,H,H,L,L,PH] -> [1,0,L,H,L,L,H,L]; "S3
[L,0,1,L,H,L,L,L,PH] -> [0,0,L,L,L,L,L,L]; "GOTO IDLE

"IO WRITE CYCLE

[L,0,1,L,H,H,L,L,PH] -> [0,1,L,H,L,L,L,H]; "BEGIN IO WRITE CYCLE
[H,0,0,H,H,L,H,L,PH] -> [1,1,L,H,L,L,L,H]; "S2, IGNORE FETCH CYCLE
[H,0,0,H,H,H,H,L,PH] -> [1,0,L,H,L,L,L,L]; "GOTO S3
[H,0,0,H,L,L,L,L,PH] -> [0,0,L,L,L,L,L,L]; "GOTO IDLE

"INSTRUCTION PREFETCH CYCLE

[H,0,0,H,L,H,L,L,PH] -> [0,0,L,L,L,L,L,L]; "WAIT FOR BCYST
[H,0,0,H,L,L,L,L,PH] -> [0,0,L,L,L,L,L,L]; "WAIT FOR BCYST
[H,0,0,H,H,H,L,L,PH] -> [0,1,L,L,H,L,L,L]; "BEGIN PREFETCH
[L,0,0,L,H,L,L,L,PH] -> [0,1,L,H,H,L,L,L]; "S1, IGNORE INTAK CYCLE
[L,0,0,L,H,H,H,L,PH] -> [0,1,L,H,H,L,L,L]; "S1, WAIT FOR READY
[L,0,0,L,H,L,H,L,PH] -> [1,1,L,H,H,L,L,L]; "GOT RDY, GOTO S2
[L,0,0,L,H,H,L,L,PH] -> [1,0,L,H,H,L,L,L]; "GOTO S3
[L,0,0,L,H,L,L,L,PH] -> [0,0,L,L,L,L,L,L]; "GOTO IDLE

FIG. 11F

"INTERRUPT ACKNOWLEDGE

[L,0,0,H,H,H,L,L,PH] -> [0,1,H,L,L,L,L,L]; "BEGIN INTAK
[H,1,0,H,H,L,L,L,PH] -> [0,1,H,H,L,L,L,L]; "S1, IGNORE CP MEM READ
[H,1,0,H,H,H,L,L,PH] -> [0,1,H,H,L,L,L,L]; "S1, WAIT FOR READY
[H,1,0,H,L,H,L,PH] -> [1,1,H,H,L,L,L,L]; "GOT RDY, GOTO S2
[H,1,0,H,H,H,H,L,PH] -> [1,0,H,H,L,L,L,L]; "GOTO S3
[H,1,0,H,H,L,L,L,PH] -> [0,0,L,L,L,L,L,L]; "GOTO IDLE

"COPROCESSOR MEMORY READ

[H,1,0,H,H,H,L,L,PH] -> [0,1,L,L,H,L,L,L]; "BEGIN CP MEM READ
[H,1,0,L,L,L,L,L,PH] -> [0,1,L,H,H,L,L,L]; "S1, IGNORE CP MEM WRITE
[H,1,0,L,L,H,L,L,PH] -> [0,1,L,H,H,L,L,L]; "S1, WAIT FOR READY
[H,1,0,L,L,L,H,L,PH] -> [1,1,L,H,H,L,L,L]; "S2
[H,1,0,L,L,H,H,L,PH] -> [1,0,L,H,H,L,L,L]; "GOTO S3
[H,1,0,L,L,L,L,L,PH] -> [0,0,L,L,L,L,L,L]; "GOTO IDLE

"COPROCESSOR MEMORY WRITE

[H,1,0,L,H,H,L,L,PH] -> [0,1,L,H,L,H,L,L]; "BEGIN CP MEM WRITE
[L,1,0,L,L,L,L,L,PH] -> [0,1,L,H,L,H,L,L]; "S1, IGNORE CP MEM WRITE
[L,1,0,L,L,H,L,L,PH] -> [0,1,L,H,L,H,L,L]; "S1, WAIT FOR READY
[L,1,0,L,L,L,H,L,PH] -> [1,1,L,H,L,H,L,L]; "GOT RDY, GOTO S2
[L,1,0,L,L,H,H,L,PH] -> [1,0,L,H,L,L,L,L]; "GOTO S3
[L,1,0,L,L,L,L,L,PH] -> [0,0,L,L,L,L,L,L]; "GOTO IDLE

"Reset tests (make sure state machine goes idle on RESET)

[H,1,0,L,H,H,L,L,PH] -> [0,1,L,H,L,H,L,L]; "BEGIN CP MEM WRITE
[H,1,0,L,H,L,L,H,PH] -> [0,0,L,L,L,L,L,L]; "Reset
[H,1,0,L,L,H,L,L,PH] -> [0,0,L,L,L,L,L,L]; "WAIT FOR BCYST
[H,1,0,L,H,H,L,L,PH] -> [0,1,L,H,L,H,L,L]; "BEGIN CP MEM WRITE
[L,1,0,L,L,L,H,L,PH] -> [1,1,L,H,L,H,L,L]; "S2
[L,1,0,L,H,L,H,PH] -> [0,0,L,L,L,L,L,L]; "Reset "Inactive cycles "[H,1,1,L,L,L,L,L,PH] -> [0,0,L,L,L,L,L,L]; IDLE
"[H,1,1,L,H,H,L,L,PH] -> [0,0,L,L,L,L,L,L]; ignore
"[L,1,1,L,L,L,L,L,PH] -> [0,0,L,L,L,L,L,L]; HALT ACK
"[L,1,1,H,H,H,L,L,PH] -> [0,0,L,L,L,L,L,L]; ignore
"[L,1,0,H,L,L,L,L,PH] -> [0,0,L,L,L,L,L,L]; CP Read
"[L,1,0,H,H,H,L,L,PH] -> [0,0,L,L,L,L,L,L]; ignore
"[L,1,0,L,L,L,L,L,PH] -> [0,0,L,L,L,L,L,L]; CP Write
"[L,1,0,H,H,H,L,L,PH] -> [0,0,L,L,L,L,L,L]; ignore

FIG. 11G end_Control2
^Z

FIG. 11H

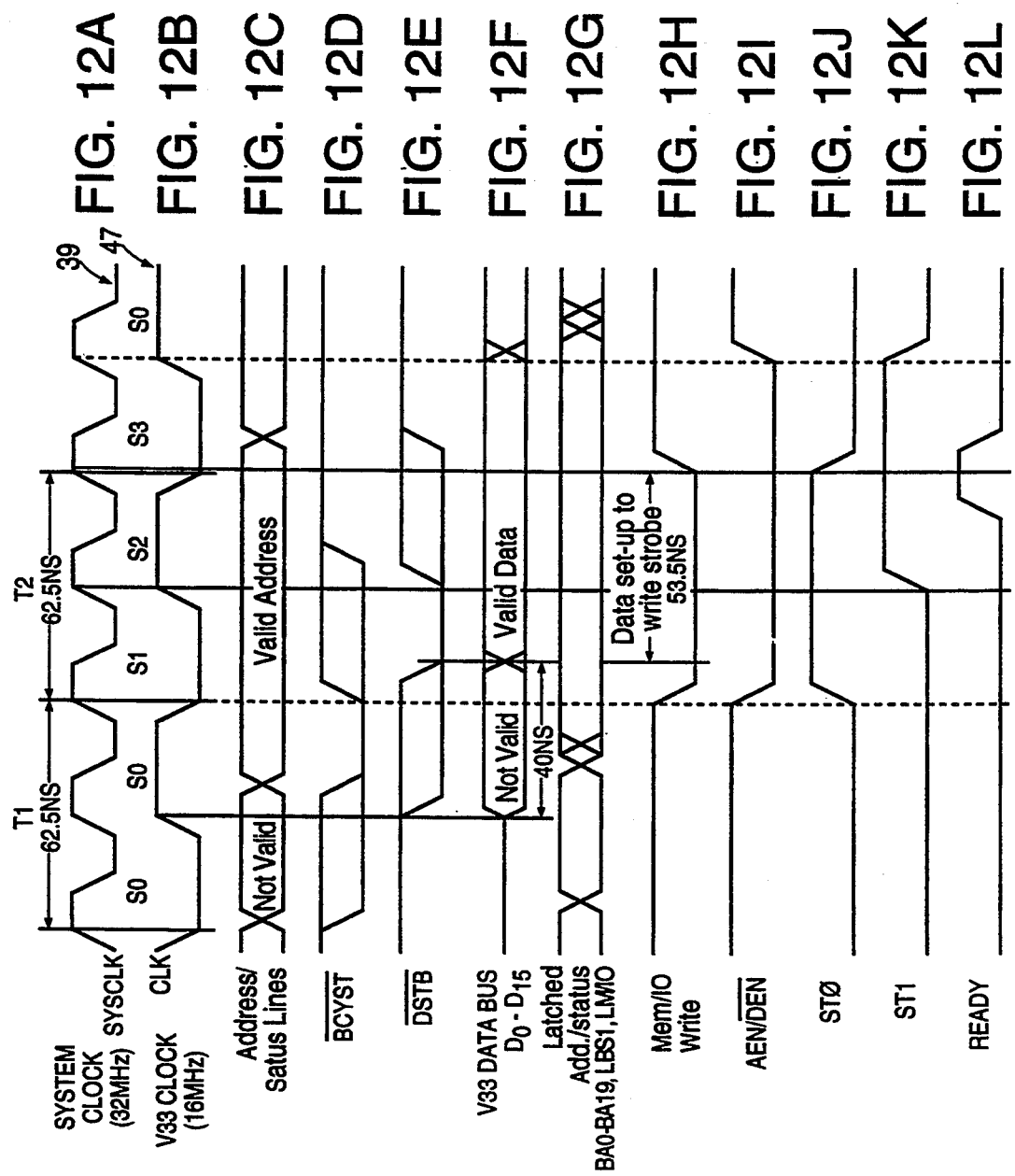

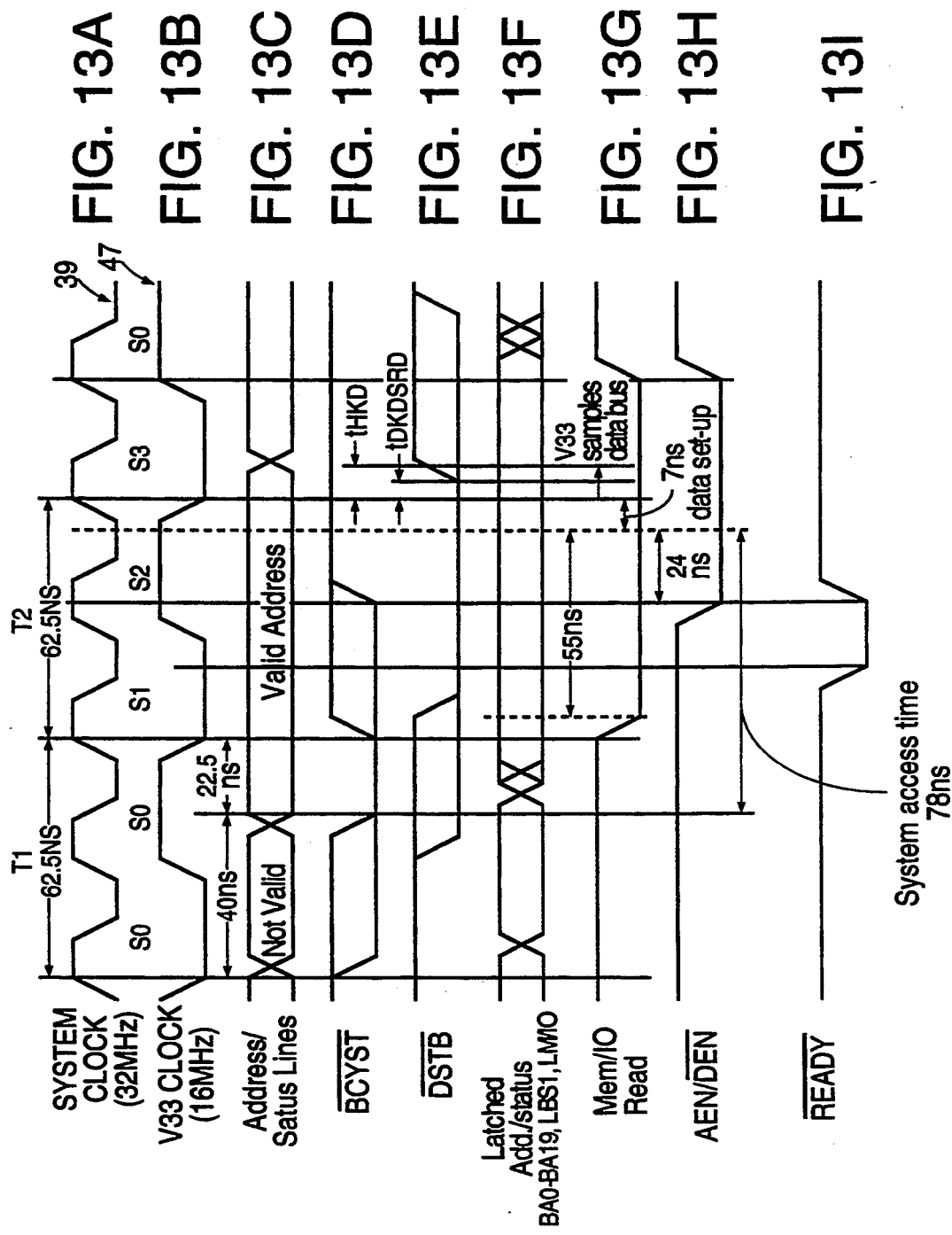

Module _Clock
Flag '-r3','-s', '-KY','-f','-v'

Title
'V33 clock generator and ready timing control
V-Series Applications Engineering Group
NEC Electronics, 1 Natick Exec. Pk., Natick MA  01760'

Clock  Device  'P16V8R';

"Pins Declarations:
"Inputs
OSCI              pin 2;
WC2,WC1,WC0       pin 5,4,3;
!BCYST            pin 6;
!XRDY1            pin 7;
XRDY2             pin 8;
RESET             pin 9;
CLOCK             pin 1;
!OE               pin 11;

"Outputs
SYSCLK            pin 19;
V33CLK            pin 18;
!WS2,!WS1,!WS0    pin 17,16,15;
!Load             pin 14;
!WRDY             pin 13;
!READY            pin 12;

"Constant Declarations:

ON, OFF  =  1, 0;
x,X,L,H, PH, PL  =  .X.,.X., 0, 1, .C., .K.; "PH, PL means Pulse High, Low "Theory of Operation:

"This PAL generates the V33 clock and the system clock signals. The system
"clock is twice the V33 clock frequency. This allows the state machine in the
"CONTROL PAL to change its outputs in the middle of the V33 clock states. A
"TTL oscillator is connected to the OSCI input. This signal is buffered to
"produce the SYSCLK output. This output externally is connected to the
"CLOCK pin of this PAL, so that the asynchronous output SYSCLK is also the
"synchronous input clock. This gives a skew of 3-7.5 nsec delay from SYSCLK
"to V33CLK.

"This PAL also generates the V33 READY signal. A 3-bit code is presented on
"the WC inputs. This is loaded into a 3-bit down-counter. If the code is 0,
"then no wait states are inserted. If the code is bigger, then up to

FIG. 15A

"7 waits will be added. Wait states are inserted until the counter reaches 0.
"The counter is decremented when the V33 clock signal is low, that is, just
"before V33CLK falling edges.

Equations
"SYSCLK Output:

"Buffer the oscillator input
SYSCLK = !OSCI;
"V33CLK Output:

"Toggle on every SYSCLK rising edge

V33CLK := !V33CLK;

"Waitstate generator

"This logic comprises a 3-bit downcounter and the WRDY flip-flop which is the
"output of the waitstate generator. When the counter reaches 0, WRDY is set.
"Load is a signal used to load the WC input into the counter and to clear the
"WRDY flipflop.

"Load is asserted for one clock cycle after BCYST is sampled at the end of the
"V33 T1, that is when V33CLK is high and BCYST is asserted.

Load := BCYST & V33CLK & !RESET;

"WS<2:0> form a 3-bit down counter with a synchronous parallel load from
"the WC inputs. Once loaded, WS will count down on every falling edge of
"V33CLK. However, since the PAL is clocked with SYSCLK, WS counts when
"V33CLK is high, simulating the falling edge of V33CLK. When WS reaches
"001, WRDY will be asserted, thus disabling any further counting (but WS will
"still go to 0 since WRDY is set during the next clock cycle). When WRDY is
"asserted, the counter is disabled, and READY is enabled.

"An XOR function is used to implement the counter. When counting is enabled
"(WRDY not asserted and V33CLK high) and the previous stages in the
"counter are all low, the current stage will toggle.

```
WS0   := Load & WC0 & !RESET "parallel load term
       # ((!WRDY & V33CLK) $ WD0); "Toggle until WRDY is asserted WS1   := Load & WC1 & !RESET
       # ((!WRDY & V33CLK & !WS0) $ WS1); "XOR makes toggle FF WS2   := Load & WC2 & !RESET
       # ((!WRDY & V33CLK & !WS0 & !WS1) $ WS2); "Toggle on WS<1:0>=00
```

FIG. 15B

"WRDY is used to enable the down counter and to signal READY when the
"counter counts all the way down. WRDY is cleared at the start of a bus cycle
"(BCYST asserted during V33CLK high). If the WC inputs are 000 signifying
"no waits states, WRDY will be set on the next clock. WS will still be loaded
"with 000, but WRDY will be set before WS gets another clocking edge. In this
"case, READY must be asserted when WRDY is still off. So, the READY
"equations force READY on whenever the WC inputs are 0.
"If WC is not 000, WRDY will be turned off, and WS will count down. When
"WS = 001, WRDY will be turned on in the next clock period where V33CLK is
"high (V33CLK falling edge), disabling any more counting.

```
WRDY := !V33CLK & (!WC2 & !WC1 & !WC0)  "assertion term for WC = 0
     #  V33CLK & (!WS2 & !WS1 & WS0)    "assertion term for WC = 1
     #  WRDY & !(BCYST & V33CLK)        "once on, keep on till new cycle
     #  RESET;  assert after reset
```

"READY is asserted whenever all possible ready sources are asserted. In the
"case of XRDY1 and XRDY2 being asserted, and WC = 0, there is not enough
"time to wait for WRDY to be asserted, so a direct term is added to assert
"READY if WC = 0.

```
READY =  XRDY1 & XRDY2 & WRDY                "for WC not 000
      #  XRDY1 & XRDY2 & !WC2 & !WC1 & !WC0;  "for WC = 000
```

Test_Vectors ([BCYST, WC2, WC1, WC0, XRDY1, XRDY2, RESET, CLOCK]
    -> [V33CLK, Load, WS2, WS1, WS0, WRDY, READY])

```
[L,1,1,1,H,H,H,PH] -> [L,L,X,X,X,H,H];  "Reset
[L,1,1,1,H,H,H,PH] -> [H,L,X,X,X,H,H];
[L,1,1,1,H,H,L,PH] -> [L,L,X,X,X,H,H];  "Idle
[L,1,1,1,H,H,L,PH] -> [H,L,X,X,X,H,H];
[L,1,1,1,H,H,L,PH] -> [L,L,X,X,X,H,H];

[H,1,1,1,H,H,L,PH] -> [H,L,X,X,X,H,H];  "Start
[H,1,1,1,H,H,L,PH] -> [L,H,X,X,X,L,L];  "Load comes on, WRDY off
[L,1,1,1,H,H,L,PH] -> [H,L,1,1,1,L,L];  "Load
[L,1,1,1,H,H,L,PH] -> [L,L,1,1,0,L,L];  "Decrement
[L,1,1,1,H,H,L,PH] -> [H,L,1,1,0,L,L];  "Wait for CLK high

[L,1,1,1,H,H,L,PH] -> [L,L,1,0,1,L,L];  "Decrement
[L,1,1,1,H,H,L,PH] -> [H,L,1,0,1,L,L];  "Wait for CLK high
[L,1,1,1,H,H,L,PH] -> [L,L,1,0,0,L,L];   "Decrement
[L,1,1,1,H,H,L,PH] -> [H,L,1,0,0,L,L];  "Wait for CLK high
[L,1,1,1,H,H,L,PH] -> [L,L,0,1,1,L,L];   "Decrement

[L,1,1,1,H,H,L,PH] -> [H,L,0,1,1,L,L];    "Wait for CLK high
```

FIG. 15C

[L,1,1,1,H,H,L,PH] -> [L,L,0,1,0,L,L]; "Decrement
[L,1,1,1,H,H,L,PH] -> [H,L,0,1,0,L,L]; "Wait for CLK high
[L,1,1,1,H,H,L,PH] -> [L,L,0,0,1,L,L]; "Decrement
[L,1,1,1,H,H,L,PH] -> [H,L,0,0,1,L,L]; "Done

[L,1,1,1,H,H,L,PH] -> [L,L,0,0,0,H,H]; "Assert WRDY
[L,1,1,1,H,H,L,PH] -> [H,L,0,0,0,H,H];
[L,1,1,1,H,H,L,PH] -> [L,L,0,0,0,H,H];
[H,1,1,1,H,H,L,PH] -> [H,L,0,0,0,H,H]; "Start, WC = 0, no waits
[H,0,0,0,H,H,L,PH] -> [L,H,0,0,0,L,H]; "Load and READY come on

[L,0,0,0,H,H,L,PH] -> [H,L,0,0,0,H,H]; "Done
[L,0,0,0,H,H,L,PH] -> [L,L,0,0,0,H,H]; "Idle
[H,0,0,0,H,H,L,PH] -> [H,L,0,0,0,H,H]; "Start, WC = 1, one wait
[H,0,0,1,H,H,L,PH] -> [L,H,0,0,0,L,L]; "Load comes on, RDY off
[L,0,0,1,H,H,L,PH] -> [H,L,0,0,1,L,L]; "Load counter

[L,1,1,1,H,H,L,PH] -> [L,L,0,0,0,H,H]; "Count down, Assert WRDY
[L,1,1,1,H,H,L,PH] -> [H,L,0,0,0,H,H]; "Done
[L,1,1,1,H,H,L,PH] -> [L,L,0,0,0,H,H]; "Idle end _Clock

FIG. 15D

COMPUTER SYSTEM WITH A BUS CONTROLLER

BACKGROUND OF THE INVENTION

1. Field of the Invention

This invention relates to computer processors, and more particularly to using programmable logic devices (PLDs) for a bus controller, a clock generator and a wait state controller for a V33 microprocessor.

2. Description of Related Art

The V33 microprocessor is described in μPD70136 (V33) 16-Bit Microprocessors: High-Speed, CMOS, a publication available from NEC Electronics Inc., 401 Ellis Street, P.O. Box 7241, Mountain View, Calif. 94039. The V33 microprocessor has an internal clock rate of up to 16 MHz. As shown in FIG. 1, the V33 microprocessor 1 has data lines $D_0$–$D_{15}$ which carry data between microprocessor 1 and, say, circuitry 1000 which may contain memory, I/O and other devices. Microprocessor 1 also has address lines $A_0$–$A_{23}$ which can be used, for example, to carry the address of a memory location in circuitry 1000 to which location data on $D_0$–$D_{15}$ must be written by microprocessor 1 or from which location data must be driven onto $D_0$–$D_{15}$ to be subsequently read by microprocessor 1. Microprocessor 1 also has status lines BUSST0, BUSST1, M/$\overline{IO}$, R/$\overline{W}$, $\overline{UBE}$, $\overline{BCYST}$, and $\overline{DSTB}$. These lines inform circuitry 1000 of the state of microprocessor 1. For example, $\overline{DSTB}$ is asserted low by microprocessor 1 when microprocessor 1 writes data on $D_0$–$D_{15}$ or reads data from $D_0$–$D_{15}$. Thus DSTB can be used to signal circuitry 1000 when to start or stop reading data from $D_0$–$D_{15}$ or writing data onto $D_0$–$D_{15}$.

Signals on some of the lines of microprocessor 1 can be skewed. For example, when microprocessor 1 writes data onto $D_0$–$D_{15}$, it may assert $\overline{DSTB}$ before the address lines $A_0$–$A_{23}$ and the status lines BUSST0, BUSST1, M/$\overline{IO}$, R/$\overline{W}$, $\overline{UBE}$ and $\overline{BCYST}$ become valid. If circuitry 1000 starts reading data from $D_0$–$D_{15}$ when $\overline{DSTB}$ gets asserted, circuitry 1000 may end up reading the data to a wrong address indicated by invalid lines $A_0$–$A_{23}$. Also, when microprocessor 1 reads data from $D_0$–$D_{15}$, it may deassert $\overline{DSTB}$ too soon, i.e. before it has actually finished reading. As a result, if circuitry 1000 stops driving data onto $D_0$–$D_{15}$ when $\overline{DSTB}$ gets deasserted, microprocessor 1 might get wrong data from $D_0$–$D_{15}$.

Such skewing of signals is not unique to the V33 microprocessor. It occurs in other fast computer processors. The problems caused by the skewing in other processors have been solved by using a bus controller. FIG. 2 shows a block diagram for such a solution. Microprocessor 900 is a fast microprocessor, such as, for example, a type 80286 available from Intel Corporation, Santa Clara, Calif. A circuitry 1001, like circuitry 1000 in FIG. 1, may contain memory, I/O, and other devices. Lines 990 include data and address lines of microprocessor 900. A bus controller 901 is a logic device which accepts, as input, status lines 991 from microprocessor 900 and, perhaps, some other signals (not shown), for example, a clock signal. Bus controller 901 produces control signals 992 which inform circuitry 1001 of the state of microprocessor 900 and which are free from skewing problems of lines 990 and 991. An example of bus controller 901 is the type 82288 controller described in 82288 *Bus Controller for iAPX 286 Processors* (INTEL Corporation, 1985). Also known in the prior art is a PLD programmed to perform as bus controller 901 for INTEL 80286. Unfortunately, these bus controllers cannot be used with a type V33 microprocessor because the status lines, address lines and data lines of the type 80286 microprocessor have different characteristics from those lines of the type V33 microprocessor. A bus controller for a V33 microprocessor has not been so far provided.

To cause V33 microprocessor 1, FIG. 1, to operate at 16 MHz, a 16 MHz clock signal (processor clock) must be provided on input CLK of microprocessor 1. A diagram of such a signal 47 is shown in FIG. 3. The signal 47 is used to synchronize the operation of microprocessor 1. That is to say, microprocessor 1 detects when the processor clock 47 is high (segment 63, FIG. 3), when it is low (segment 64), and when the transitions 65 between the high and low states occur, and microprocessor 1 performs some well-defined operations when the processor clock is high, some operations when the processor clock is low, some operations during the transitions from the low level to the high level (i.e. on the rising edge of the processor clock 47), and some operations during the transitions from the high level to the low level (on the falling edge of the processor clock 47).

A 16 MHz clock signal can be generated by an oscillator. FIG. 3 shows a diagram of such a signal 48. Unfortunately, the rising and falling edges 62 of the oscillator signal 48 can be too long to be used with microprocessor 1. Microprocessor 1 requires these edges to be at most 5 ns (parameters tKR, tKF in FIG. 3). The oscillator signal edges 62 can be much longer. However, circuits are known that "waveshape" oscillator signal 48 to produce a "square" wave, i.e. a signal with shorter rising and falling edges.

In some computer systems, some devices connected to a 16 MHz processor may have to be synchronized by a faster "system" clock, say a 32 MHz clock. Such computer systems comprising, say, a 16 MHz microprocessor V60 (μPD70616) are well-known in the art. Microprocessor V60 is described in the μPD70616(V60) data sheet, 1986, available from NEC. In such a computer system, a 16 MHz processor clock may be generated from a 32 MHz system clock by, say, an NEC chip μPD71611 described in μPD71611 *CMOS Clock Generator*, September 1986. FIG. 4 shows a block diagram of part of such a computer system. Chip 2025 is a 16 MHz clock generator μPD71611. Chip 2025 accepts a 32 MHz system clock EXFS from another clock generator 2026. From system clock EXFS, chip 2025 generates a 16 MHz processor clock CLK for a V60 microprocessor 2001. System clock EXFS is also used to synchronize devices 2003. Chip 2025 also generates an 8MHz clock PRCLK (not shown) for synchronizing other devices (not shown) connected to microprocessor 2001. FIG. 3 shows a diagram of system clock 46 (EXFS) and processor clock 49 (CLK).

Unfortunately, there exists a significant skew between the clocks EXFS and CLK. In other words, as is seen from FIG. 3, there is a significant time difference between the edges of EXFS and CLK. The time interval tDCKL between the falling edge 66 of the system clock EXFS and the falling edge 68 of the processor clock CLK can be up to 20 ns. The time interval tDCKH between the falling edge 67 of the system clock EXFS and the rising edge 69 of the processor clock CLK can also be up to 20 ns. Some computer systems need that skew to be much smaller.

It should also be noted that chip 2025 is a customized, non-programmable chip.

A typical operation of microprocessor 1, such as reading data from memory or writing data to an I/O device, lasts one bus cycle. FIG. 5 shows a diagram of processor clock 47 (CLK) in a bus cycle. Each bus cycle starts on a falling edge of the processor clock 47 (point 85 in FIG. 5) and lasts for 2 or more periods of the clock 47 depending on how fast the memory or the I/O device is. Each such period of the clock 47 is called a bus state. The first bus state of a bus cycle is called T1, the second bus state T2. A bus cycle may consist of only two bus states—T1 and T2. Yet if a memory or I/O device needs more time to complete the operation, microprocessor 1 will insert additional bus states (called wait states) into the bus cycle. The bus cycle in FIG. 5 has 3 wait states—TW1, TW2 and TW3.

Devices connected to microprocessor 1, such as devices of circuitry 1000, inform microprocessor 1 that they are ready for the current bus cycle to terminate, by asserting the $\overline{READY}$ line of microprocessor 1 low. See FIG. 1. FIG. 5 shows a diagram of the $\overline{READY}$ signal 45 for a bus cycle with 3 wait states. Microprocessor 1 will sample its $\overline{READY}$ line at point 81 of T2, and since $\overline{READY}$ is high at that point, microprocessor 1 will insert the first wait state TW1. Microprocessor 1 will sample $\overline{READY}$ again at point 82 of TW1 and, seeing $\overline{READY}$ high, will insert another wait state, TW2. Microprocessor 1 will then sample $\overline{READY}$ at point 83 and, seeing $\overline{READY}$ high, will insert TW3. Microprocessor 1 will again sample $\overline{READY}$ at point 84. By this time, circuitry 1000 has asserted $\overline{READY}$ low, and microprocessor 1 will terminate the bus cycle. The next bus state will be T1 of the next bus cycle.

This way of terminating a bus cycle is not unique to the V33 microprocessor 1. V60 microprocessor 2001, FIG. 4, also has a $\overline{READY}$ line used similarly to the $\overline{READY}$ line of microprocessor 1. In prior art computer systems using the V60 microprocessor, it was found that $\overline{READY}$ generation could be simplified by using a wait state controller as shown in FIG. 4. Chip 2025, which acts as a clock generator for V60 microprocessor 2001, acts also as a wait state controller for microprocessor 2001. A device 2004 connected to chip 2000 does not itself assert the $\overline{READY}$ line of chip 2001. Instead the device 2004 provides on lines WAIT0, WAIT1, and WAIT2, the number of wait states which it wants to be inserted into the current bus cycle. This number can be any number between zero and seven. This number is provided to chip 2025 which asserts the $\overline{READY}$ line of microprocessor 2001 accordingly.

Unfortunately, chip 2025 is incompatible with V33. Also, chip 2025 is not programmable.

SUMMARY OF THE INVENTION

This invention provides a bus controller for a V33 microprocessor. In one embodiment, the bus controller is implemented by a programmable logic device (PLD) which can be programmed by the user to closely fit the needs of a particular computer system using a V33 microprocessor.

The present invention provides also a clock generator generating both a 16 MHz clock and a 32 MHz clock with a skew between the clocks not more than 4ns. This skew is acceptable for many V33 microprocessor applications. In one embodiment, the clock generator is a PLD.

In addition, the present invention provides a programmable wait state controller.

Furthermore, the present invention provides a wait state controller for a V33 microprocessor. In one embodiment, the wait state controller and the clock generator are implemented as parts of the same PLD.

BRIEF DESCRIPTION OF THE DRAWINGS

FIG. 3 shows a diagram of an oscillator output signal, a diagram of a processor clock for a V33 microprocessor, and diagrams of a 32 MHz input EXFS and a 16 MHz output CLK of $\mu$PD71611, a clock generator for a V60 microprocessor;

FIGS. 11(i-viii) presents PLD equations for a bus controller of the embodiment of FIGS. 8, 9, 10;

FIG. 12 shows timing diagrams of some V33 microprocessor and bus controller signals during a write cycle in one embodiment of the invention;

FIG. 13 shows timing diagrams of some V33 microprocessor and bus controller signals during a read cycle in one embodiment of the present invention;

FIG. 15(i-iv) presents PLD equations for a Ready/-Clock generator of the embodiment of FIGS. 8, 9, 10;

DESCRIPTION OF THE PREFERRED EMBODIMENTS

Figure 1:
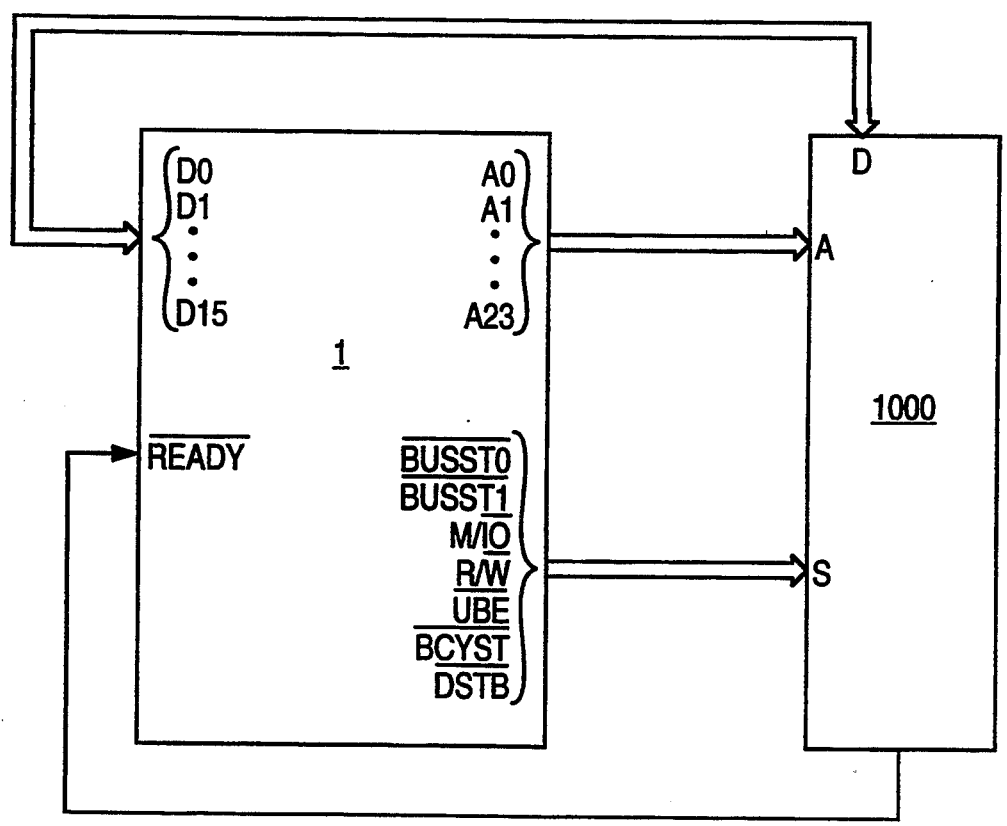
FIG. 1 shows a prior art V33 microprocessor system.
Figure 2:
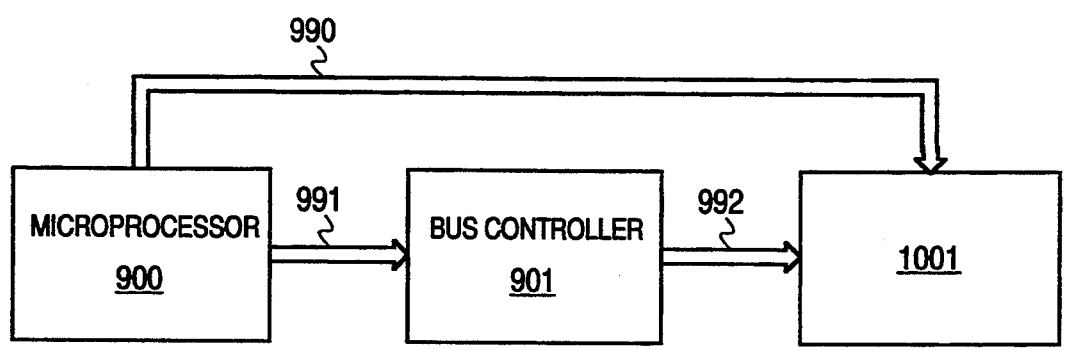
FIG. 2 shows a block diagram of a type 80286 microprocessor system with a bus controller.
Figure 4:
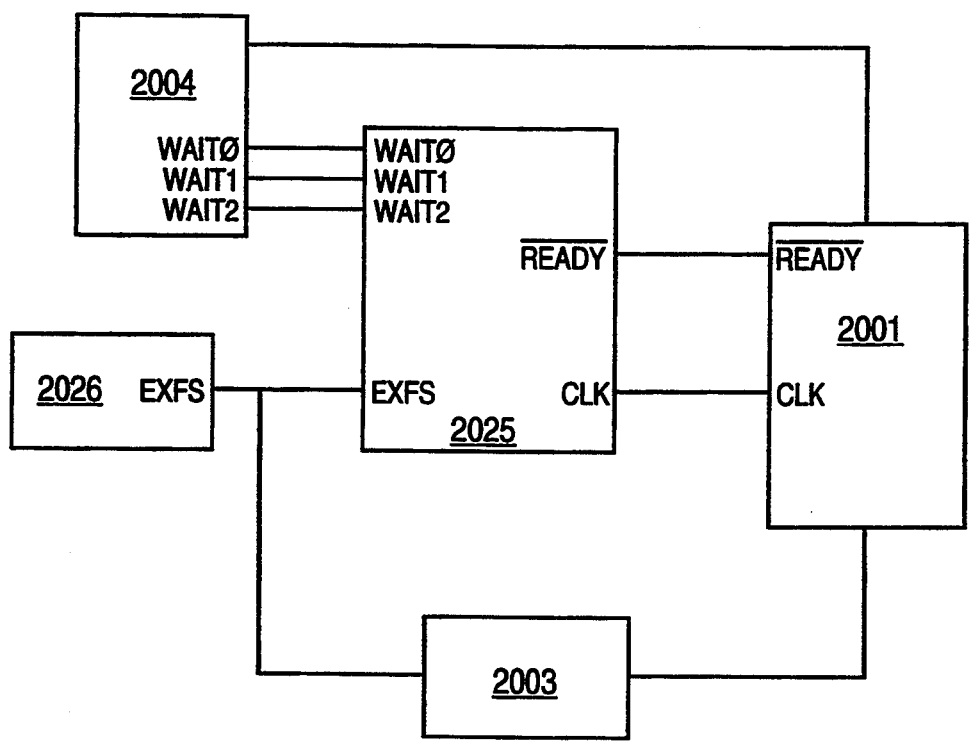
FIG. 4 shows a block diagram of a V60 microprocessor system with clock generator $\mu$PD71611.
Figure 5:
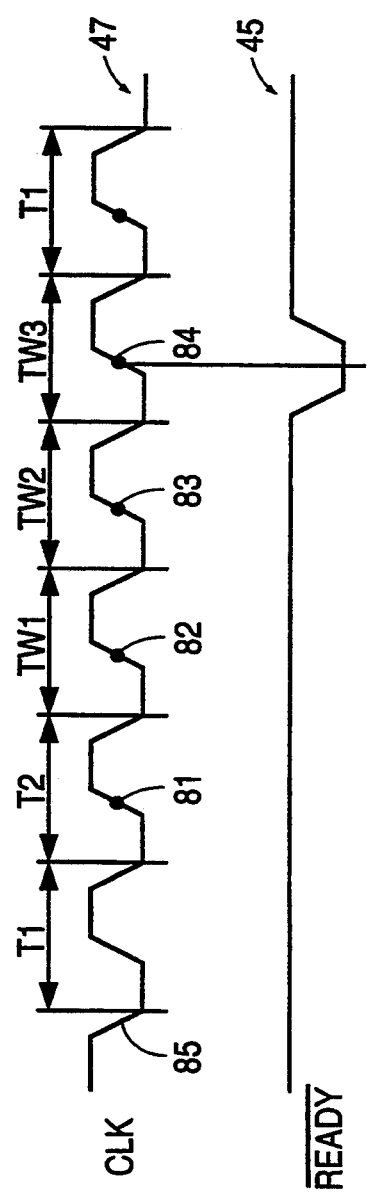
FIG. 5 shows diagrams of a processor clock and a $\overline{READY}$ line of a V33 microprocessor during a bus cycle.
Figure 6:
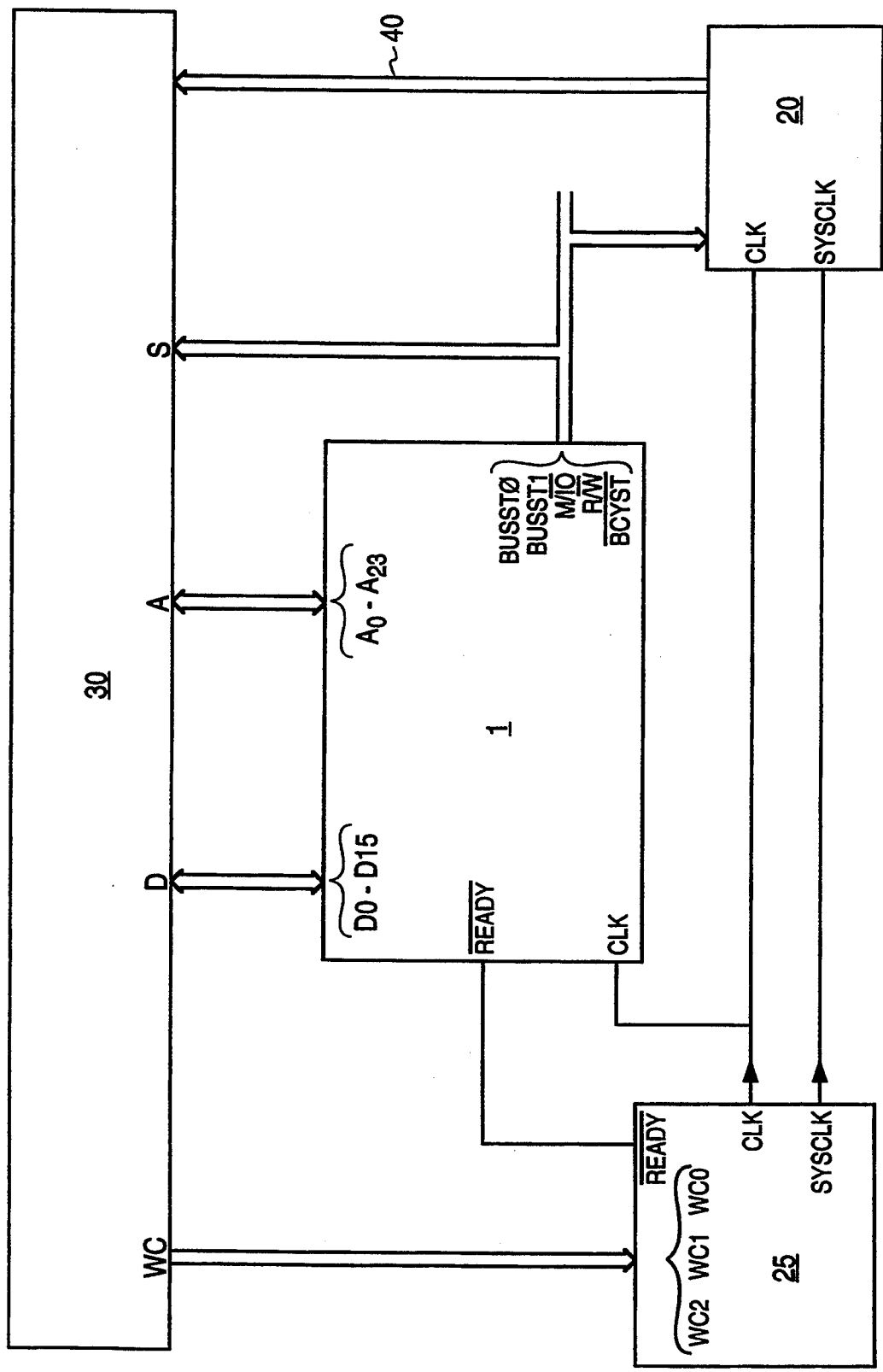
FIG. 6 shows a block diagram of a V33 microprocessor system according to one embodiment of the invention.

FIG. 6 shows a block diagram of one embodiment of the present invention. V33 microprocessor 1 is connected to external circuitry 30 which may include I/O devices, memory devices, a floating point processor and other devices. Status lines BUSST0, BUSST1, M/$\overline{IO}$, R/$\overline{W}$, and $\overline{BCYST}$ of microprocessor 1 are inputs to a bus controller 20. From these and other inputs bus controller 20 produces control signals 40 which control external circuitry 30. External circuitry 30 reads data from or writes data onto data bus $D_0$–$D_{15}$.

External circuitry 30 also accepts as input address lines $A_0$–$A_{23}$ and status lines from microprocessor 1.

This embodiment also includes a Ready/Clock generator 25. Ready/Clock generator 25 generates a 16 MHz processor clock CLK and a 32 MHz system clock SYSCLK. The processor clock CLK is used by microprocessor 1. Both clocks are used by bus controller 20 and may be used by other parts of the system of FIG. 6.

Ready/Clock generator 25 also acts as a wait state controller for microprocessor 1. Ready/Clock generator 25 accepts on lines WC2, WC1, and WC0 from external circuitry 30 the number of wait states to be inserted into the current bus cycle. From this number, Ready/Clock generator 25 produces the $\overline{\text{READY}}$ signal for microprocessor 1.

Figure 7:
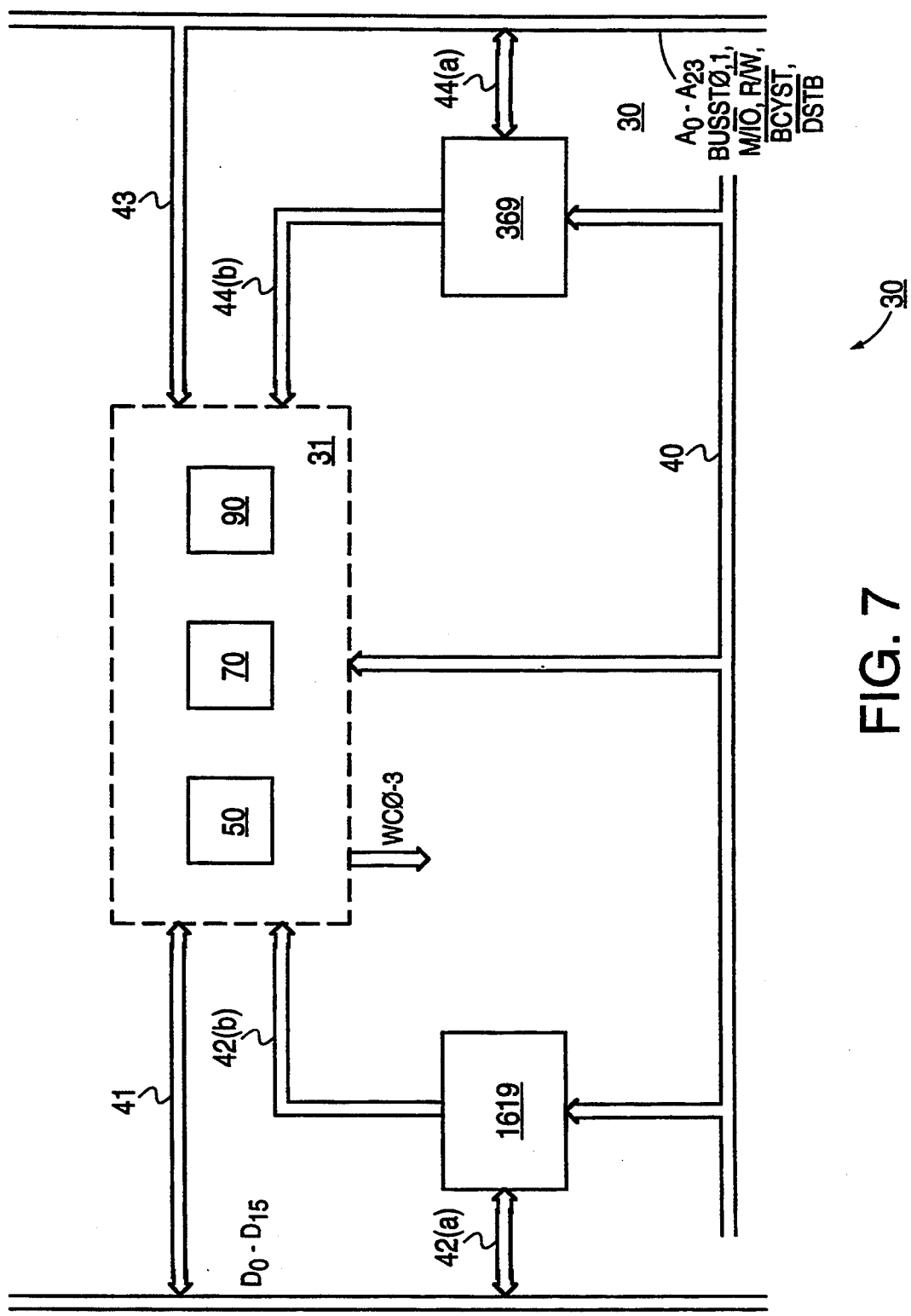
FIG. 7 shows a more detailed block diagram of external circuitry of the embodiment of FIG. 6.
Figure 8B:
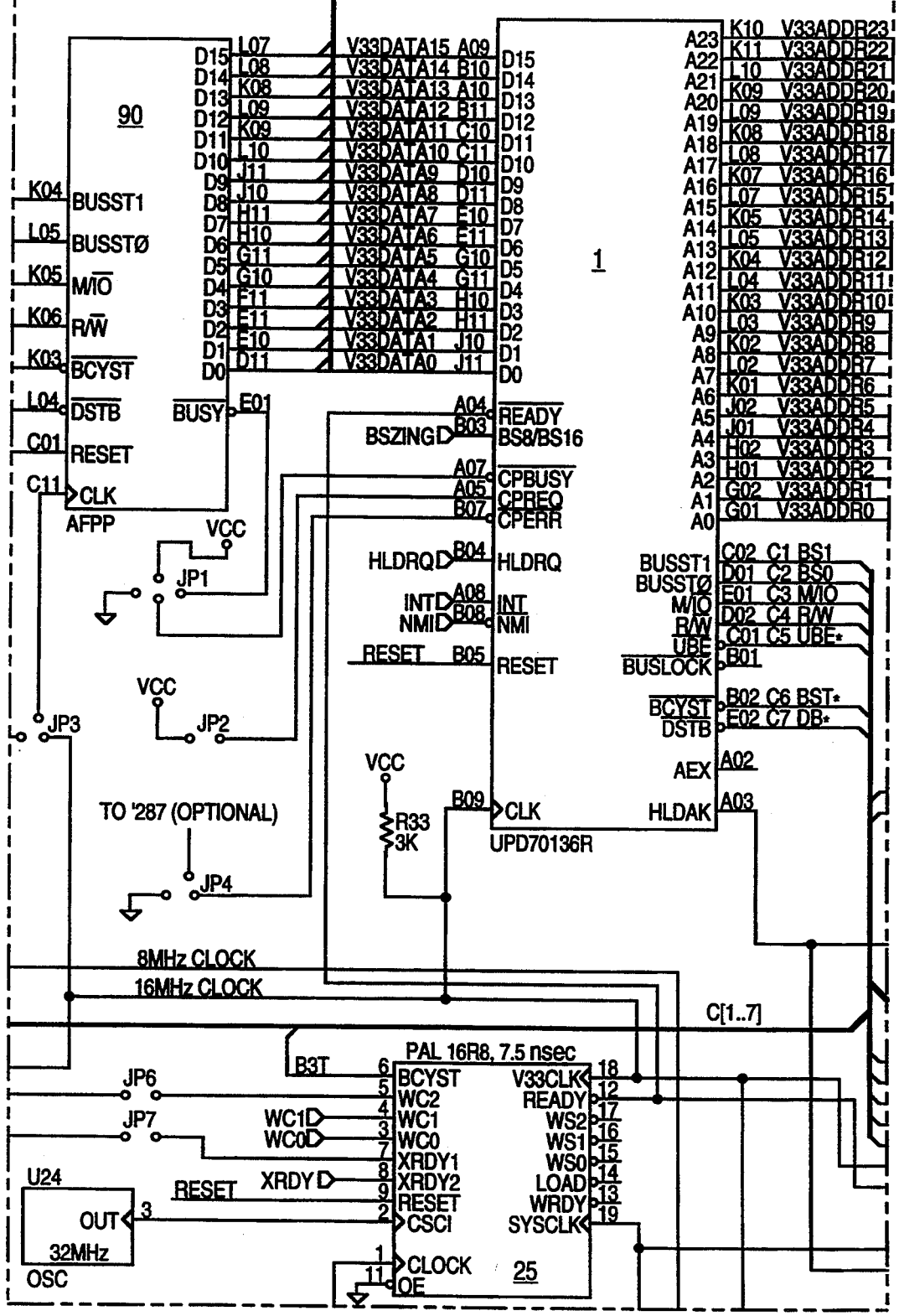
FIGS. 8, 9 and 10 show a schematic of one embodiment of the invention.
Figure 8C:
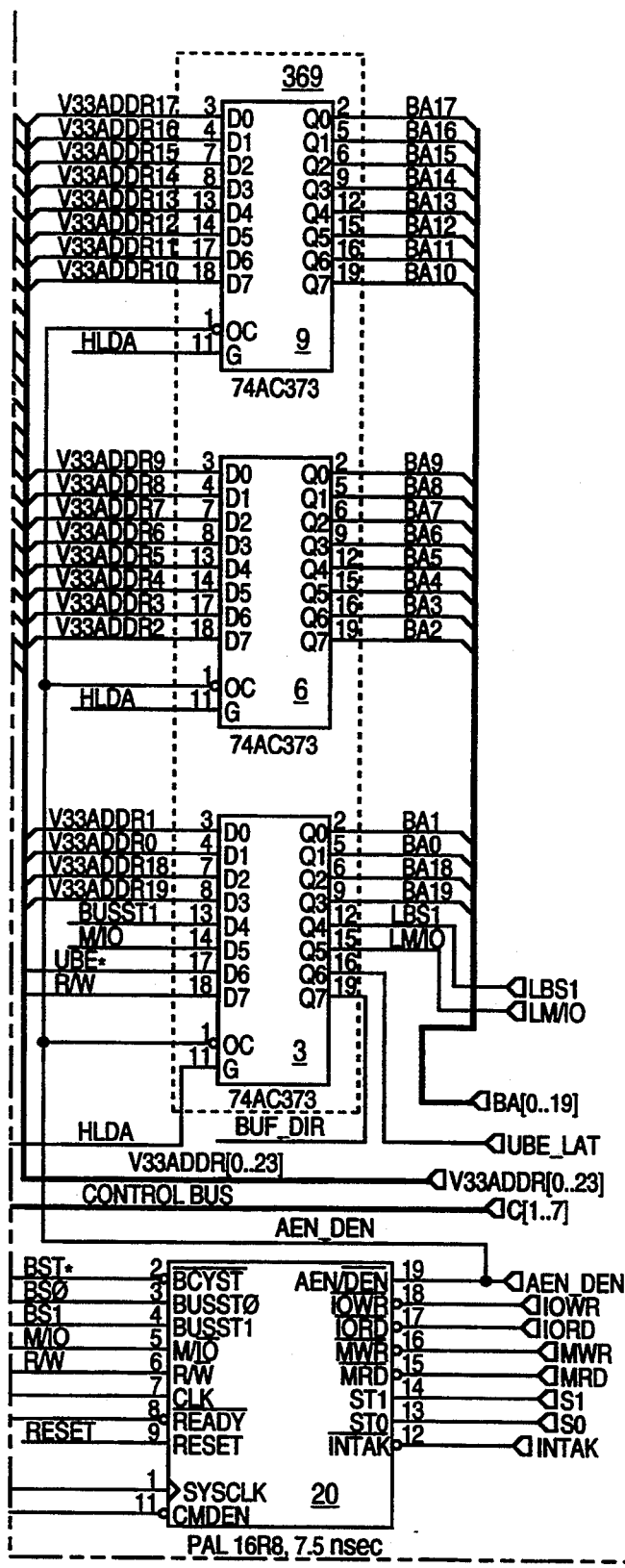
Figure 8D:
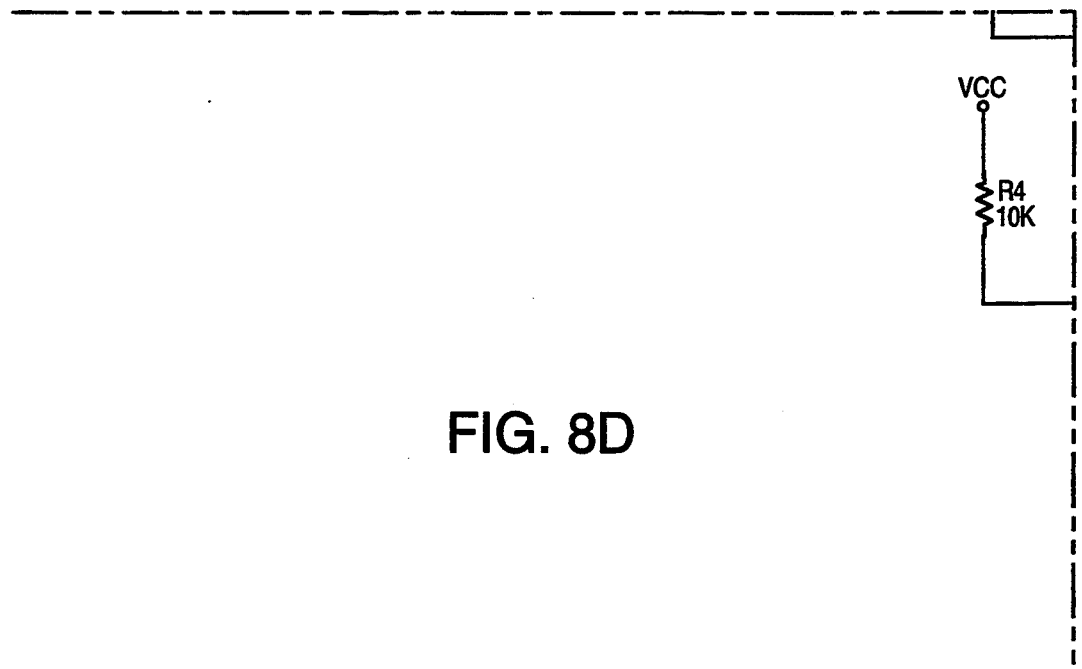
Figure 8E:
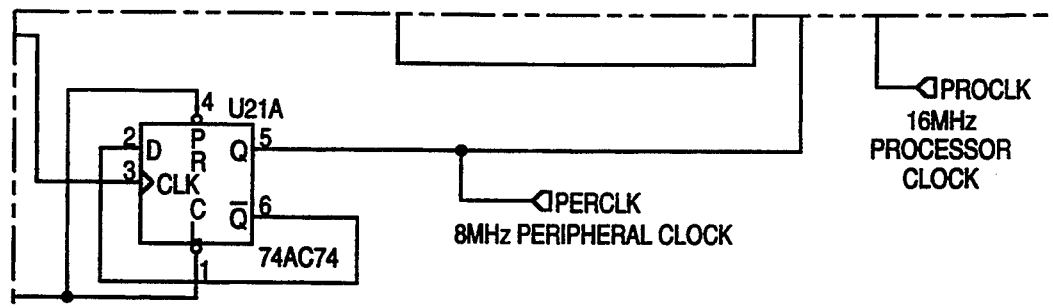
Figure 9A:
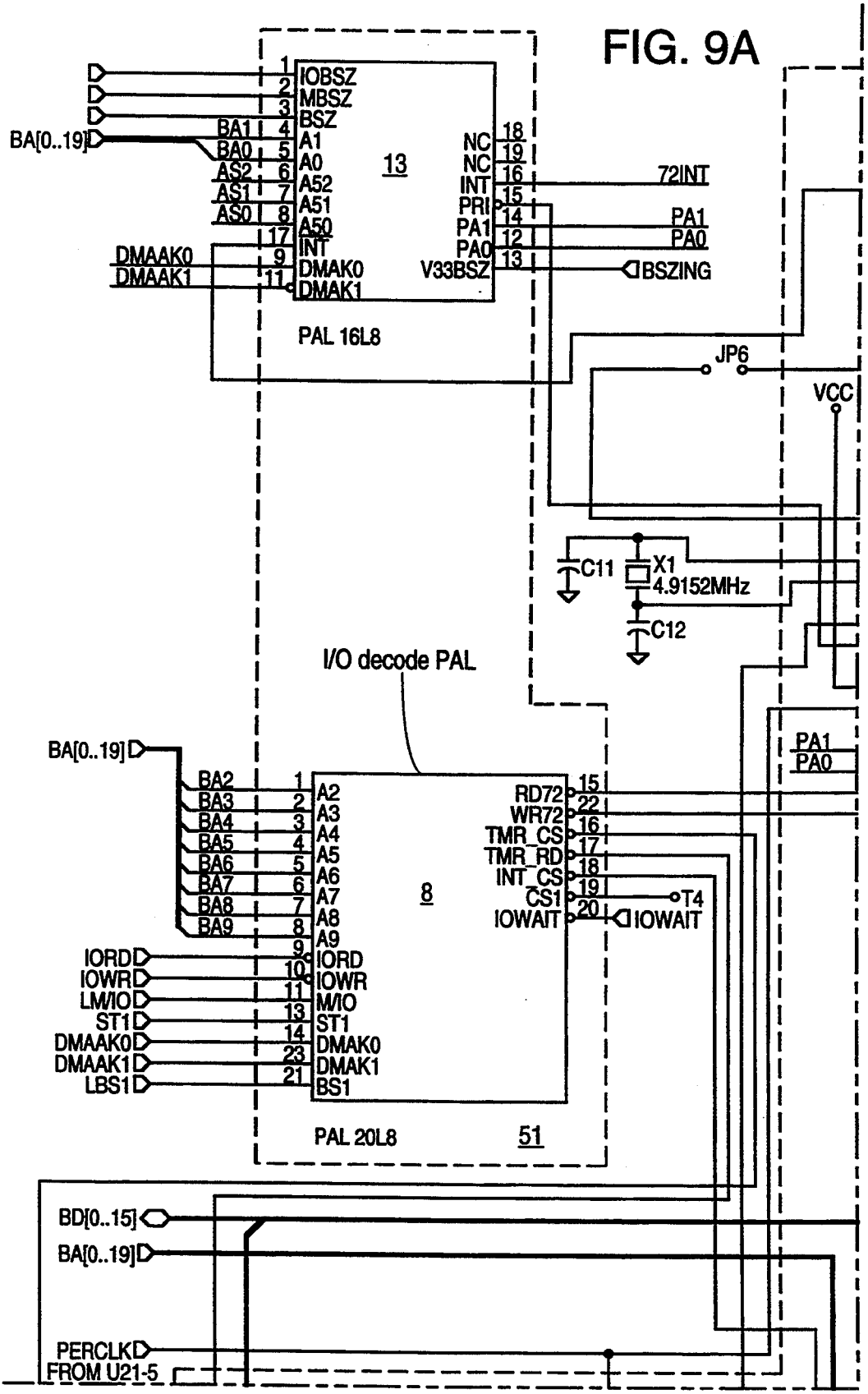
Figure 9B:
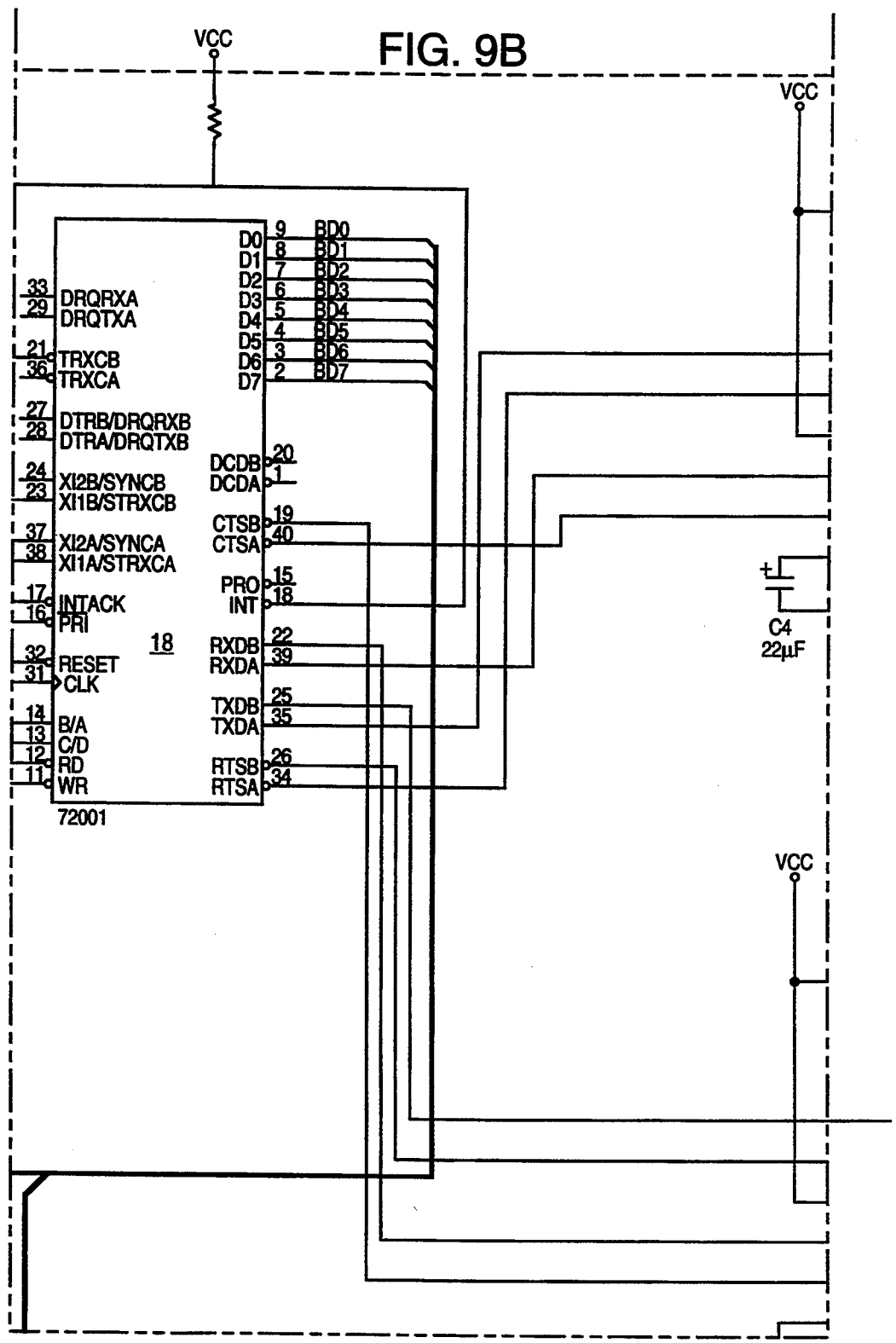
Figure 9C:
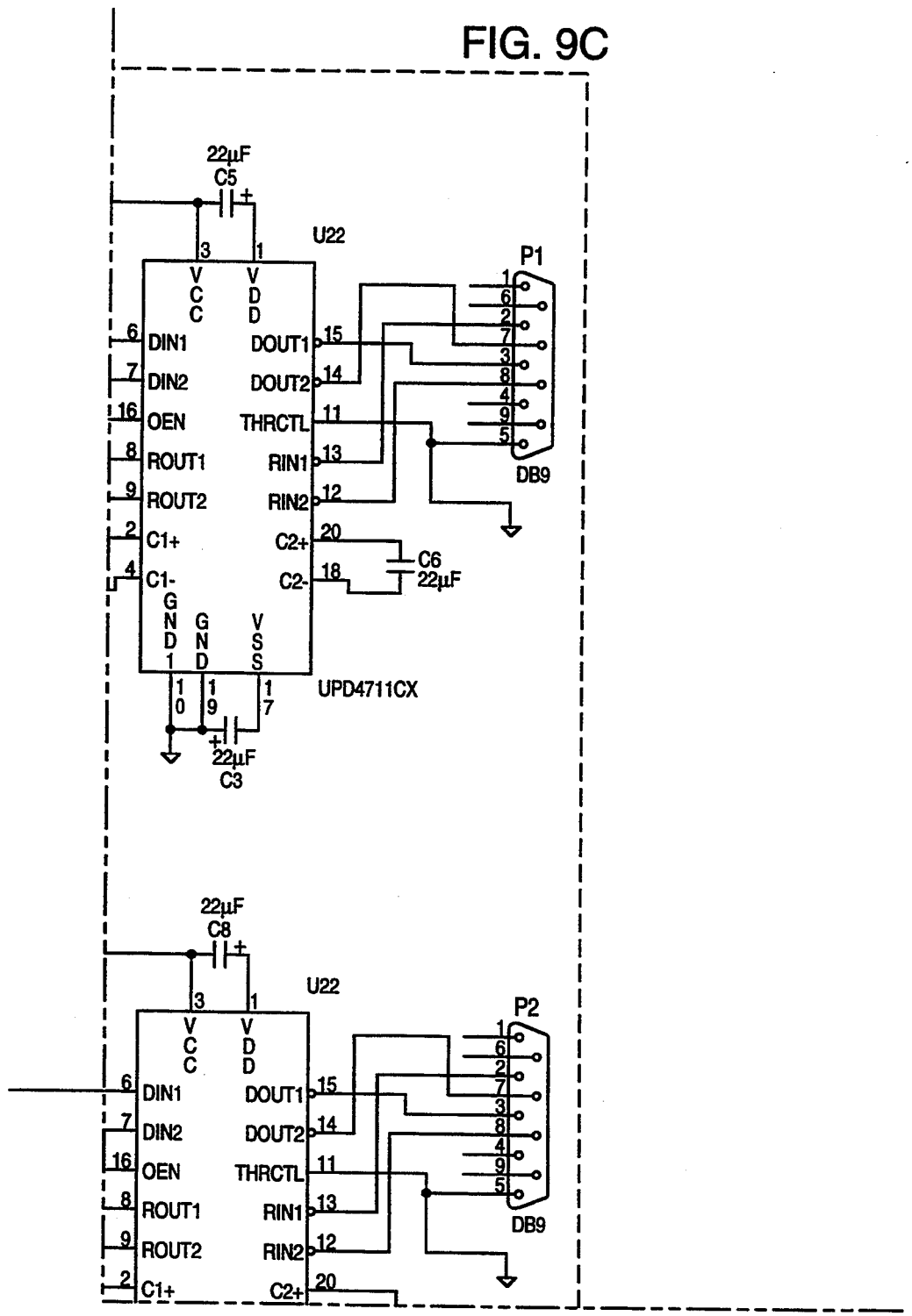
Figure 9D:
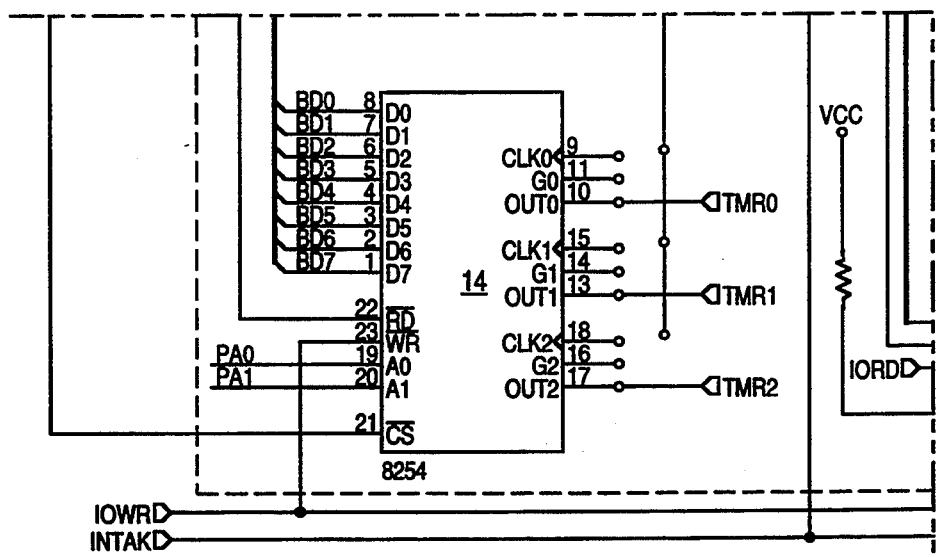
Figure 9E:
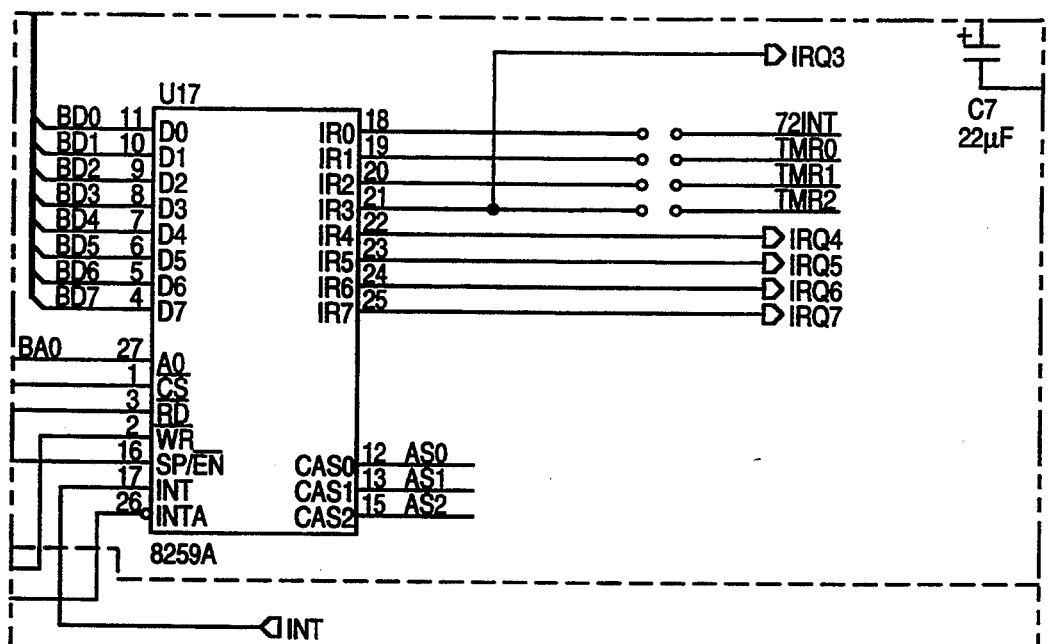
Figure 9F:
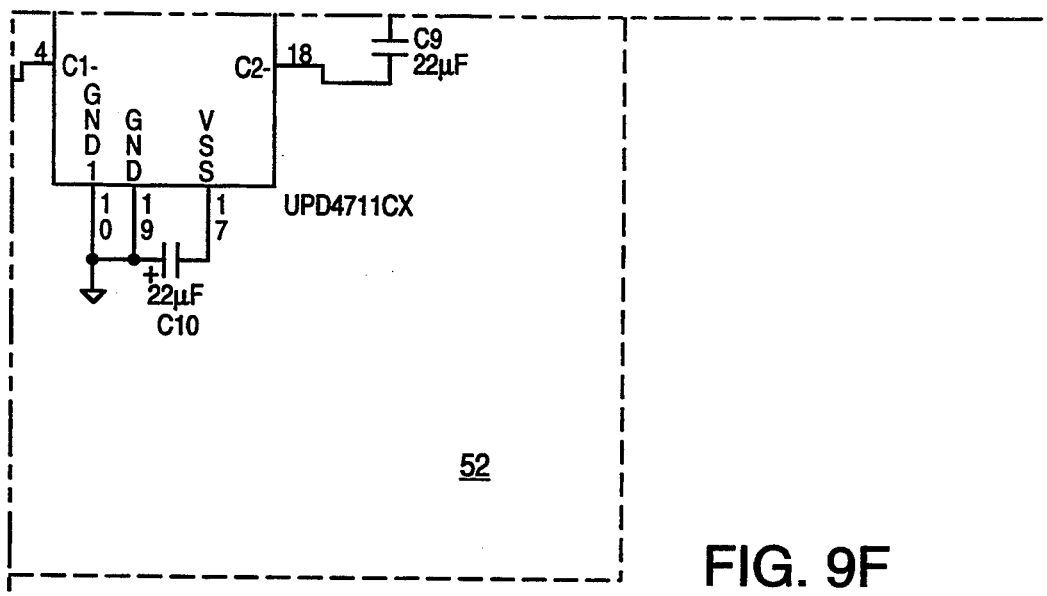

FIG. 7 shows external circuitry 30 in greater detail. External circuitry 30 contains a computer subsystem 31, data buffers 1619, and address latches 369. Subsystem 31 contains an I/O subsystem 50, a memory subsystem 70, and a floating point subsystem 90. Some parts of subsystem 31 may be connected to data bus $D_0$–$D_{15}$ by lines 41 directly. Other parts of subsystem 31 may be connected to data bus $D_0$–$D_{15}$ through data buffers 1619 by lines 42(a) and 42(b). Data buffers 1619 may electrically connect or disconnect lines 42(a) and lines 42(b) from each other thus connecting or disconnecting those parts of subsystem 31 from data bus $D_0$–$D_{15}$. Data buffers 1619 are controlled by control signals 40 from bus controller 20.

Some parts of subsystem 31 may be connected to address lines $A_0$–$A_{23}$ and status lines directly by lines 43, other parts may be connected to address lines $A_0$–$A_{23}$ and status lines through address latches 369 by lines 44(a) and 44(b). Address latches 369 can latch the values of the address and status lines of microprocessor 1 and maintain those values on lines 44(b) even after the values of the address and status lines of microprocessor 1 have changed. Address latches 369 are controlled by control signals 40 from bus controller 20.

V33 Microprocessor Bus Cycles

As noted above, each bus cycle of microprocessor 1 starts on a falling edge of processor clock 47 (CLK). The type of each bus cycle is determined by microprocessor 1 outputs M/$\overline{\text{IO}}$, R/$\overline{\text{W}}$, BUSST0, and BUSST1 according to the following table:

TABLE 1

| M/$\overline{\text{IO}}$ | R/$\overline{\text{W}}$ | BUSST1 | BUSST0 | Type of Bus Cycle |
|---|---|---|---|---|
| 0 | 1 | 0 | 0 | Interrupt acknowledge |
| 0 | 1 | 0 | 1 | I/O read |
| 0 | 0 | 0 | 1 | I/O write |
| 0 | 1 | 1 | 0 | Coprocessor read |
| 0 | 0 | 1 | 0 | Coprocessor write |
| 0 | 0 | 1 | 1 | HALT acknowledge |
| 1 | 1 | 0 | 0 | Instruction fetch |
| 1 | 1 | 0 | 1 | Memory read |
| 1 | 0 | 0 | 1 | Memory write |
| 1 | 1 | 1 | 0 | Coprocessor data read |
| 1 | 0 | 1 | 0 | Coprocessor data write |

Microprocessor 1 bus cycles can be categorized as follows.

Read Cycles
(1) memory read group of cycles consisting of:
 (i) memory read cycles (microprocessor 1 reads data from memory);
 (ii) coprocessor data read cycles (coprocessor reads from memory into an internal register of the coprocessor); and
 (iii) instruction fetch cycles;
(2) I/O read group consisting of:
 (i) I/O read cycles (microprocessor 1 reads from an I/O device); and
 (ii) coprocessor read cycles (microprocessor 1 reads from a coprocessor internal register).

Write Cycles
(1) Memory write group of cycles consisting of:
 (i) memory write cycles (microprocessor 1 writes into memory); and
 (ii) coprocessor data write cycles (coprocessor writes from its internal register into memory).
(2) I/O write group consisting of:
 (i) I/O write cycles (microprocessor 1 writes to an I/O device); and
 (ii) coprocessor write cycles (microprocessor 1 writes to an internal register of a coprocessor).

Interrupt Acknowledge Cycle
Halt Acknowledge Cycle

The following is a brief functional description of some pins of microprocessor 1. For a more complete description, see μPD70136 (V33) 16-Bit Microprocessors: High-Speed, CMOS, supra, which publication is incorporated herein by reference.

Lines $A_0$–$A_{23}$ form the address bus. These outputs become valid during T1 of every bus cycle and remain valid until the end of the bus cycle. Lines $D_0$–$D_{15}$ form the data bus. During read cycles, microprocessor 1 latches the value of these lines on the trailing edge of the last bus state of the cycle (T2 or the last wait state). During write cycles, $D_0$–$D_{15}$ become valid after the rising edge of T1 and remain valid through the rising edge of the CLK following the bus cycle.

Line R/$\overline{\text{W}}$ indicates whether the current bus cycle will be a read or a write cycle. If R/$\overline{\text{W}}$ is high, then the cycle will be a read cycle; if low, a write cycle.

Line M/$\overline{\text{IO}}$ indicates whether the current bus cycle will access memory or I/O; if M/$\overline{\text{IO}}$ is high, then memory; if low, I/O. Line $\overline{\text{BCYST}}$ (Bus Cycle Start) indicates the start of a bus cycle. It is asserted low during T1 of every bus cycle, and only for the first CLK period of each bus cycle.

Line $\overline{\text{DSTB}}$ (Data Strobe) indicates the status of the data bus $D_0$–$D_{15}$. When it is asserted low during a write cycle, microprocessor 1 drives the data on $D_0$–$D_{15}$. When microprocessor 1 asserts this output during a read cycle, external logic should drive the data onto $D_0$–$D_{15}$. $\overline{\text{DSTB}}$ is asserted following the rising edge (middle) of T1, and stays asserted through T2 and all wait states (if any) of the bus cycle. During write cycles, $\overline{\text{DSTB}}$ is deasserted after the rising edge of the last bus state of the bus cycle. During read cycles, $\overline{\text{DSTB}}$ is deasserted after the trailing edge of the last bus state.

$\overline{\text{READY}}$. Devices connected to microprocessor 1 assert $\overline{\text{READY}}$ low to inform microprocessor 1 that they are ready for the current bus cycle to terminate. As long as $\overline{\text{READY}}$ is not asserted, microprocessor 1 will add wait states to the current bus cycle. The bus state in which microprocessor 1 samples $\overline{\text{READY}}$ low will be the last state of the bus cycle. Microprocessor 1 samples $\overline{\text{READY}}$ on the rising (middle) edge of T2 and all wait states.

Figure 10A:
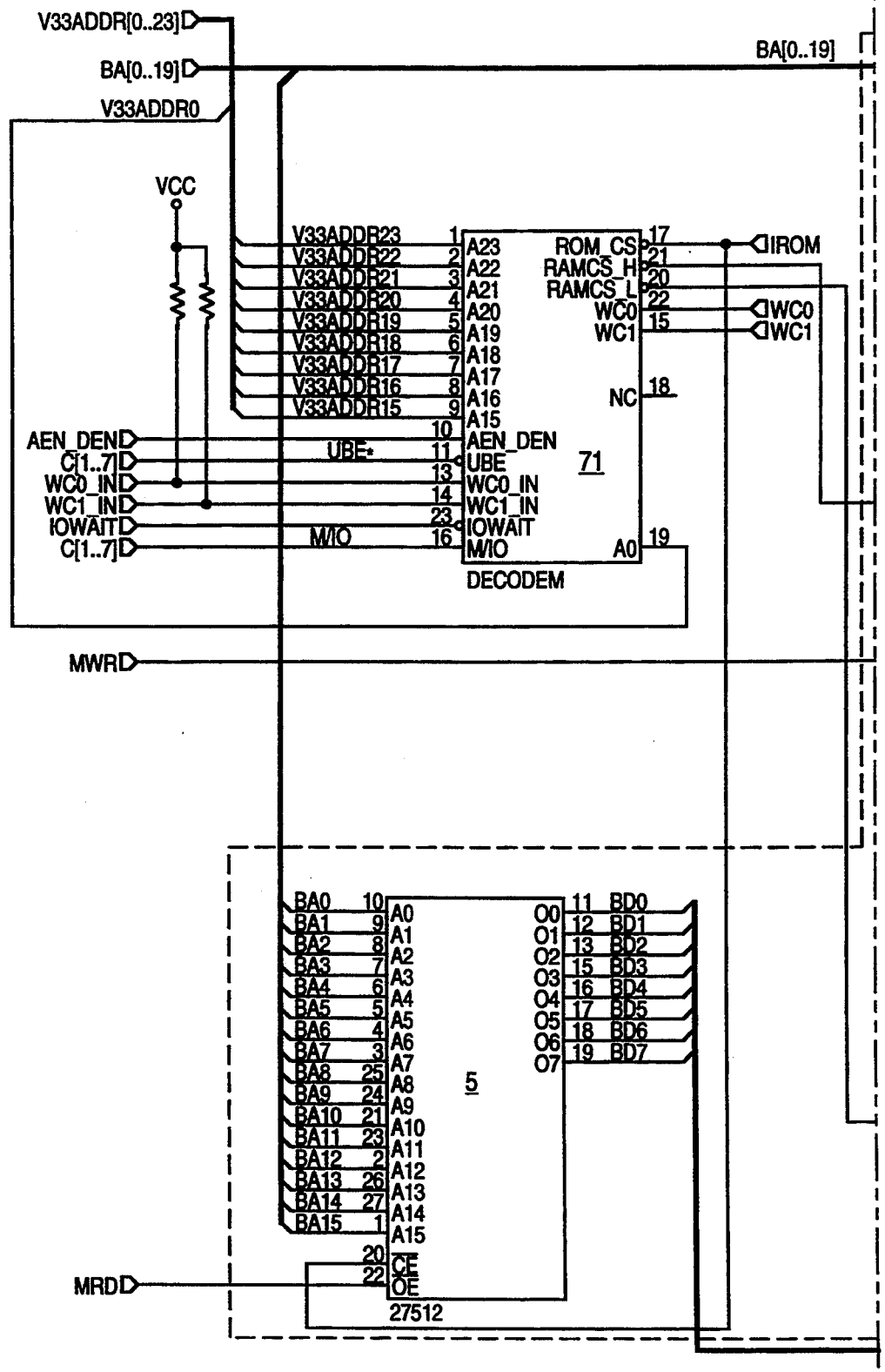
Figure 10B:
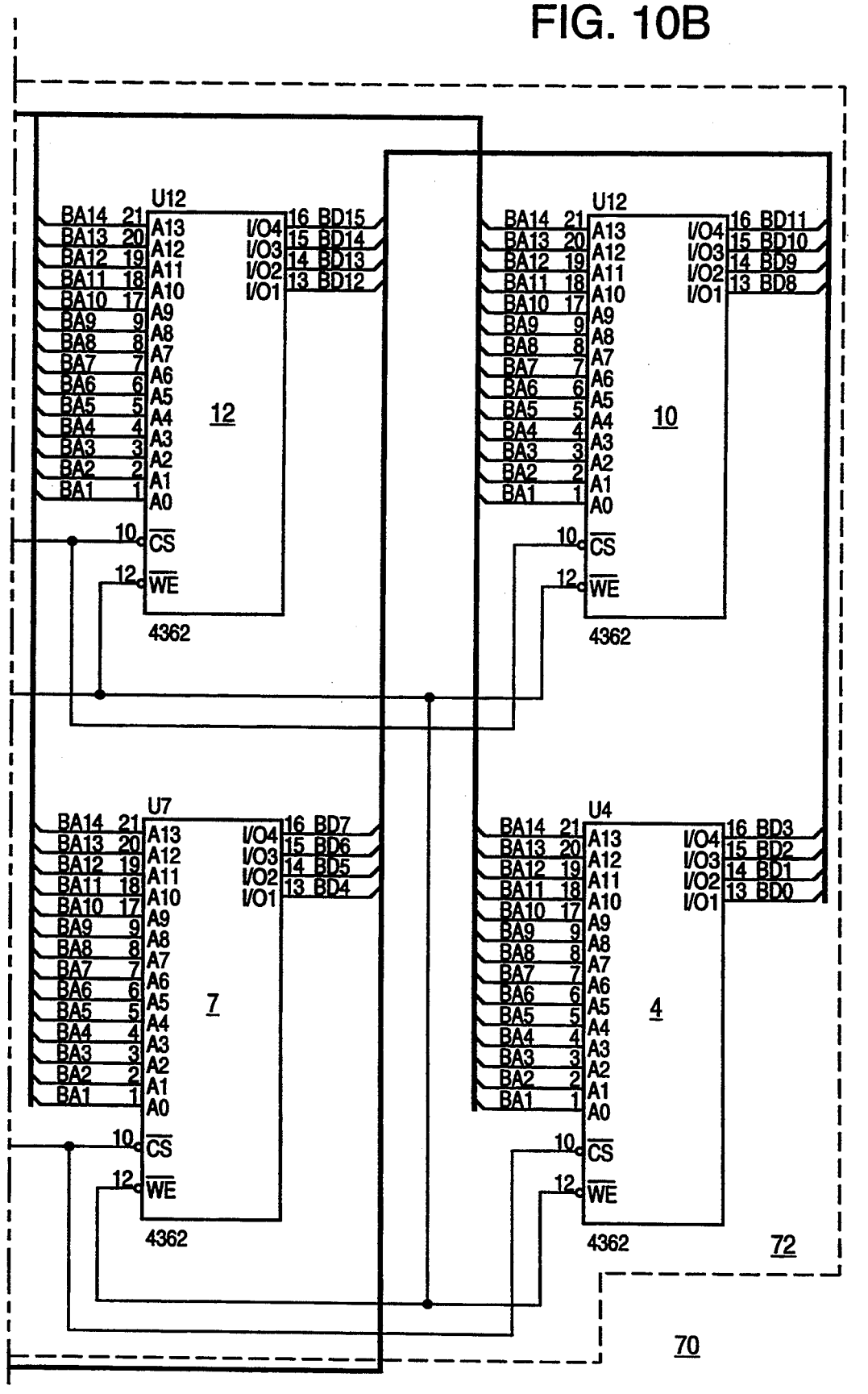

FIGS. 8, 9, and 10 show a schematic of a V33 microprocessor system. FIG. 8 shows microprocessor 1, bus controller 20, Ready/Clock generator 25, data buffers 16 and 19 corresponding to data buffers 1619 of FIG. 7, address latches 3, 6 and 9 corresponding to address latches 369 of FIG. 7, and floating point subsystem 90. Each of the address latches 3, 6 and 9 in this embodiment is implemented by chip 74AC373 well known in the art. Each of the data buffers 16 and 19 in this embodiment is implemented by chip 74AC245 also well known in the art. Control signals 40 consist of bus controller 20 outputs AEN/DEN, IOWR, IORD, MWR, MRD, ST1, ST0 and INTAK. Output AEN/DEN controls data buffers 16 and 19 and address latches 3, 6 and 9.

Address latches 3, 6 and 9 latch address lines $A_0$–$A_{19}$ and maintain the latched values on lines BA0–BA19 respectively. Address latch 3 latches also status lines BUSST1 and M/IO and maintains their values on its outputs LBS1 and LM/IO respectively. Lines BA0–BA19, LBS1 and LM/IO form lines 44(b) of FIG. 7.

Data buffers 16 and 19 can connect data lines $D_0$–$D_{15}$ to or disconnect them from lines BD0–BD15 respectively. Lines BD0–BD15 form lines 42(b) of FIG. 7.

Floating point subsystem 90 of FIG. 7 is implemented by an NEC floating point processor AFPP well known in the art.

Other parts of the system of FIG. 7 are implemented in this embodiment according to FIGS. 9 and 10 and are described below.

Bus Controller

Bus controller 20, FIG. 8, is implemented by a PLD, a 7.5 ns programmable array logic device 16R8 available from AMD corporation and well known in the art. FIGS. 11(i)-(viii) show PLD equations for bus controller 20 in "ABEL" assembler available on the market ("ABEL" is a registered trademark of DATA IO Corporation). Methods of using "ABEL" assembler to program PLDs are known in the art. The inputs of bus controller 20 are:

BUSST0, BUSST1, M/IO, R/W, BCYST, READY, RESET, and HLDAK (CMDEN pin 11 of bus controller 20) from microprocessor 1;

CLK, a 16 MHz processor clock, generated by Ready/Clock generator 25 as described below; and SYSCLK, a 32 MHz system clock generated by Ready/Clock generator 25 as described below. DSTB is not an input to bus controller 20.

Outputs of bus controller 20.

ST1, ST0—identify the state of a 4-state state machine implemented by bus controller 20 and described below.

IOWR—active low. During I/O write and coprocessor write cycles, instructs an I/O device or a coprocessor, as the case may be, to read from the data bus.

IORD—active low. During I/O read and coprocessor read cycles, instructs an I/O device or a coprocessor to write onto the data bus.

MWR—active low. During memory write and coprocessor data write cycles, instructs a memory device to read from the data bus.

MRD—active low. During memory read, coprocessor data read, and instruction fetch cycles, instructs a memory device to write onto the data bus.

AEN/DEN (ADR_DAT in PLD equations of FIGS. 11(i)-11(viii)) controls address latches 3, 6 and 9 and data buffers 16 and 19. When high, enables inputs of address latches 3, 6, and 9 to latch $A_0$–$A_{19}$, BUSST1 and M/IO and disables inputs of data buffers 16, 19 to isolate $D_0$–$D_{15}$ from lines BD0–BD15. When low, disables inputs of address latches 3, 6 and 9 (so that their outputs maintain $A_0$–$A_{19}$, BUSST1 and M/IO on lines BA0–BA19, LBS1 and LM/IO respectively) and enables inputs of data buffers 16 and 19 so that $D_0$–$D_{15}$ are electrically connected, respectively, to BD0–BD15.

INTAK—active low. During interrupt acknowledge cycles, instructs an external interrupt controller to write an interrupt vector onto the data bus.

Bus controller 20 is synchronized by the 32 MHz system clock SYSCLK. Bus controller 20 outputs change, if at all, on the rising edge of SYSCLK. See for example FIGS. 12, 13 providing timing diagrams of some of the outputs of bus controller 20.

State Machine

Bus controller 20 generates a 4-state state machine that describes the state of microprocessor 1. Bus controller outputs AEN/DEN, IOWR, IORD, MWR, MRD, and INTAK are computed with respect to that state machine. The current state of the state machine is identified by outputs ST1, ST0 of bus controller 20 as follows:

TABLE 2

| ST1 | ST0 | State |
|-----|-----|-------|
| 0 | 0 | S0 |
| 0 | 1 | S1 |
| 1 | 1 | S2 |
| 1 | 0 | S3 |

Figure 14:
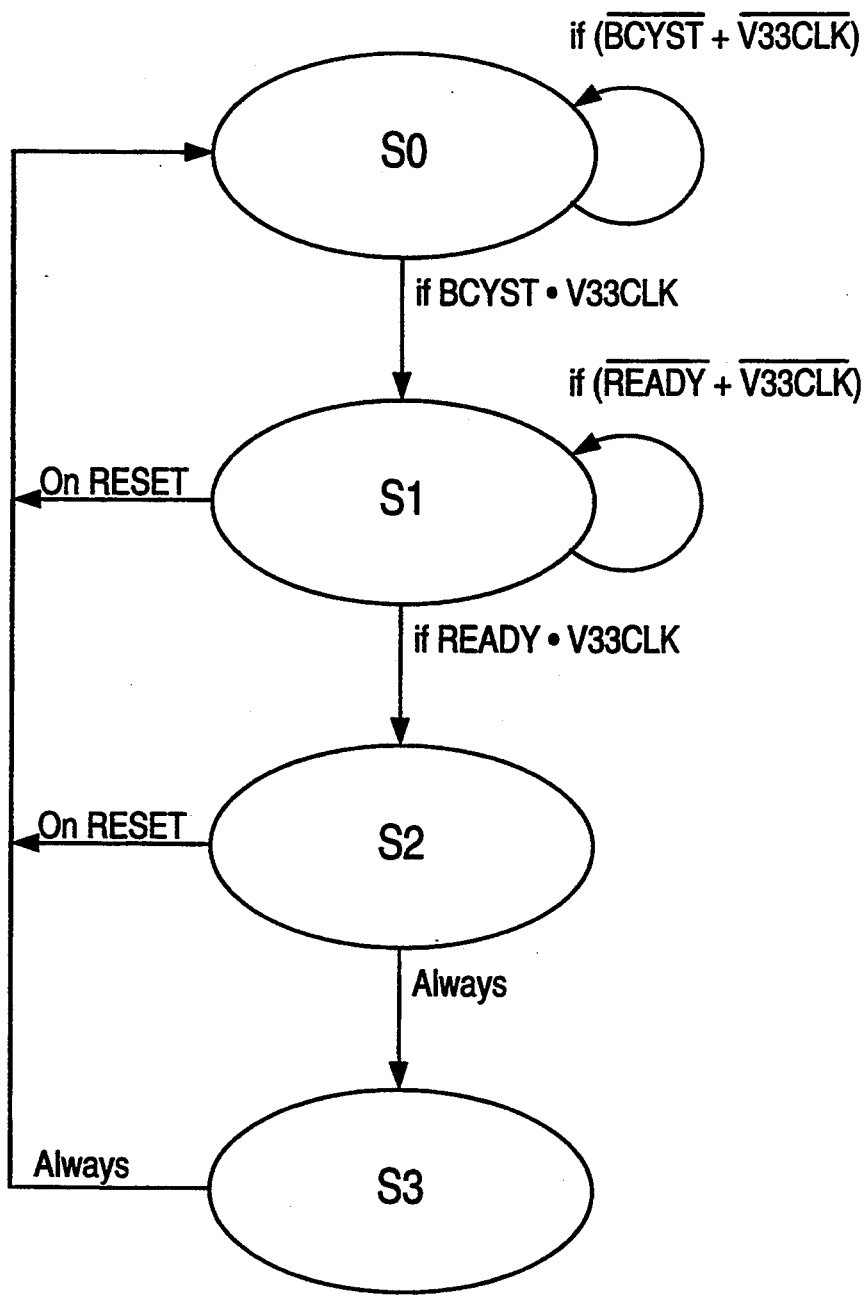
FIG. 14 shows a state transition diagram for a state machine implemented by a bus controller according to one embodiment of the present invention.

FIG. 14 shows the state transition diagram of the state machine. FIG. 12 shows the diagrams of signals ST0 and ST1 during a write cycle with no wait states. FIG. 12 shows also the diagrams of the system clock 39 (SYSCLK) and the processor clock 47 (CLK) during such a cycle. Each state transition occurs on the rising edge of system clock 39. On RESET, the state machine is in state S0. During T1 of read, write, and interrupt acknowledge cycles, BCYST gets asserted low, i.e. BCYST becomes high, and so on the falling edge of T1, the state machine enters state S1. The state machine remains in state S1 until READY is asserted, which signals the last bus state of the current bus cycle. In the middle of this last bus state, the state machine enters state S2. At the end of this last bus state, the state machine enters state S3, and on the next rising edge of system clock 39 (i.e., in the middle of T1 of the next bus cycle), it returns to S0. The PLD equations for the state machine outputs ST0 and ST1 appear in FIG. 11B, lines 18–21, 25–34; FIG. 11C; FIG. 11D, lines 1–4.

Write Cycles

FIG. 12 presents a timing diagram of some of bus controller 20 outputs during a write cycle with 0 wait states. Mem/IO Write represents:

IOWR during an I/O write or a coprocessor write cycle;

MWR during a memory write or coprocessor data write cycle.

The bus controller state machine enters S1 when microprocessor 1 enters T1. By this time, 62.5 ns from the start of T1, the address lines $A_0$–$A_{23}$ and the status lines BUSST0, BUSST1, M/IO, R/W, and UBE have become valid (it takes the address and status lines up to 40ns to settle. During T1, AEN/DEN is high. At the start of T2, in all write cycles except coprocessor write cycles, when the state machine enters state S1, AEN/DEN goes low disabling the inputs of address latches 3, 6, and 9 and enabling the inputs of data buffers 16 and 19, so that the outputs of the address latches 3, 6 and 9 maintain the address and status lines, and the data buffers 16 and 19 electrically connect lines $D_0$–$D_{15}$ to lines BD0–BD15. AEN/$\overline{DEN}$ stays low through the first half of T1 of the next bus cycle (the address lines $A_0$–$A_{23}$ and the status lines may change during that time)

In the coprocessor write cycles, AEN/$\overline{DEN}$ stays high through the whole bus cycle. In these cycles, data from data bus $D_0$–$D_{15}$ is read by floating point subsystem 90 directly, through lines 41 (FIG. 7), not through data buffers 16 and 19. AEN/$\overline{DEN}$ remains high and so isolates the data bus $D_0$–$D_{15}$ from lines BD0–BD15. In these cycles, address lines $A_0$–$A_{23}$ are not used, and so the condition of address latches 3, 6, and 9 is unimportant.

Mem/IO Write goes low, and so enables an I/O or memory device to read, when the state machine enters state S1 of a write cycle. Mem/IO Write remains low through the end of the write cycle.

Read Cycles

FIG. 13 shows a timing diagram of bus controller 20 outputs during a read or interrupt acknowledge cycle. Mem/IO Read represents:

$\overline{IORD}$ during a cycle of the I/O read group;
$\overline{MRD}$ during a cycle of the memory read group;
$\overline{INTAK}$ during an interrupt acknowledge cycle.

Mem/IO Read, when asserted low, enables a memory or peripheral device to write data onto the data bus. Mem/IO Read is asserted low at the end of T1, when the state machine enters S1, and stays low until the start of the next bus cycle, allowing microprocessor 1 up to 10 ns to read data on the data bus.

AEN/$\overline{DEN}$ is asserted low when the state machine enters S2 and is thus delayed from the assertion of Mem/IO Read. The reason for the delay is as follows. After a write cycle, microprocessor 1 requires up to 50 ns to tristate the data bus $D_0$–$D_{15}$. Therefore, in case the cycle preceding the read cycle was a write cycle, AEN/$\overline{DEN}$ is kept high through state S1, isolating $D_0$–$D_{15}$ from BD0–BD15 and giving microprocessor 1 more than 50 ns to tristate its data bus. AEN/$\overline{DEN}$ is then asserted low and kept low, like Mem/IO Read, through T1 of the next bus cycle, maintaining the latched address and status lines on the outputs of address latches 3, 6, and 9 while V33 reads the data on the data bus. FIGS. 11D and 11E show bus controller 20 PLD equations for $\overline{IORD}$, $\overline{IOWR}$, $\overline{INTAK}$, $\overline{MRD}$, $\overline{MWR}$, and ADR_DAT, the inverse of AEN/$\overline{DEN}$.

Timing diagrams of read and write cycles with one or more wait states can .be easily constructed from the PLD equations in FIGS. 11D–11E and the timing diagrams in μPD70136 (V33) 16-bit Microprocessors: High-Speed, CMOS, supra.

Clock and $\overline{READY}$ Generation

The present invention uses Ready/Clock generator 25, FIG. 8, to generate 32 MHz SYSCLK, 16 MHz CLK and $\overline{READY}$ for microprocessor 1 and bus controller 20. This Ready/Clock generator 25 is a PLD, a 7.5ns programmable array logic device 16R6 available from AMD corporation and well known in the art. FIGS. 15A–15D show the PLD equations for Ready/Clock generator 25 in "ABEL" assembler.

Clock Generation

Ready/Clock generator 25 accepts as input a 32 MHz oscillator signal OSCI. Ready/Clock generator 25 "waveshapes" this signal and produces this waveshaped signal asynchronously as a 32 MHz system clock SYSCLK on its pin 19. See FIG. 15A, line 19; FIG. 15B, lines 5–7.

Ready/Clock generator 25 uses SYSCLK as an input clock (pin 19 of Ready/Clock generator 25 is connected to pin 1, the CLOCK input) to synchronize Ready/Clock generator 25 itself.

Ready/Clock generator 25 also generates, on its pin 18, the 16 MHz processor clock CLK which is SYSCLK divided by 2. The PLD equations for processor clock CLK (V33CLK in FIGS. 15A–15D appear in FIG. 15A, line 20; FIG. 15B, lines 8–10.

Ready/Clock generator 25 has a maximum delay of 7.5 ns and a minimum delay of 3.5 ns, so the skew between processor clock CLK and system clock SYSCLK is at most 4 ns. This skew is small enough to be acceptable for many V33 applications.

$\overline{READY}$ Generation

Ready/Clock generator 25 also acts as a wait state controller for microprocessor 1. To generate $\overline{READY}$, Ready/Clock generator 25 uses the following inputs:

$\overline{BCYST}$—from microprocessor 1. Signals the start of the bus cycle as described above.

WC0, WC1, WC2—a 3-bit number of wait states to be inserted into the current bus cycle. Generated by external circuitry 30.

$\overline{XRDY1}$, $\overline{XRDY2}$—signal that assertion of $\overline{READY}$ must be delayed no matter what WC0, WC1, WC2 are. Generated by other circuitry (not shown) connected to microprocessor 1.

Ready/Clock generator 25 implements a counter counting down from the number of wait states as defined by WC0, WC1 and WC2 to 0 on every bus state after T1; Ready/Clock generator 25 asserts $\overline{READY}$ low during the bus state in which the counter reaches 0. The PLD equations for the counter and the $\overline{READY}$ signal appear in FIG. 15B, line 11 through FIG. 15C, line 20 .

The rest of the outputs of Ready/Clock generator 25 are as follows.

$\overline{WS0}$, $\overline{WS1}$, $\overline{WS2}$—WS0, WS1, WS2 form a 3-bit number which is the current value of the counter implemented by Ready/Clock generator 25 and described above.

$\overline{LOAD}$ is asserted low during the first SYSCLK period of T2. It is used to initialize WS0, WS1, WS2 to the value of WC0, WC1, WC2 before the counter begins downcount. See FIG. 15(ii), lines 16 et seq.

$\overline{WRDY}$ is asserted low one SYSCLK cycle before $\overline{READY}$ is asserted low. See FIG. 15B, lines 12–15; FIG. 15C, lines 1–19.

In the embodiment of FIGS. 8, 9, 10, WC2 is always kept at 0 because external circuitry 30 of this embodiment requires at most 3 wait states.

I/O, Memory and Floating Point Processor Interface

I/O Interface

Figure 16:
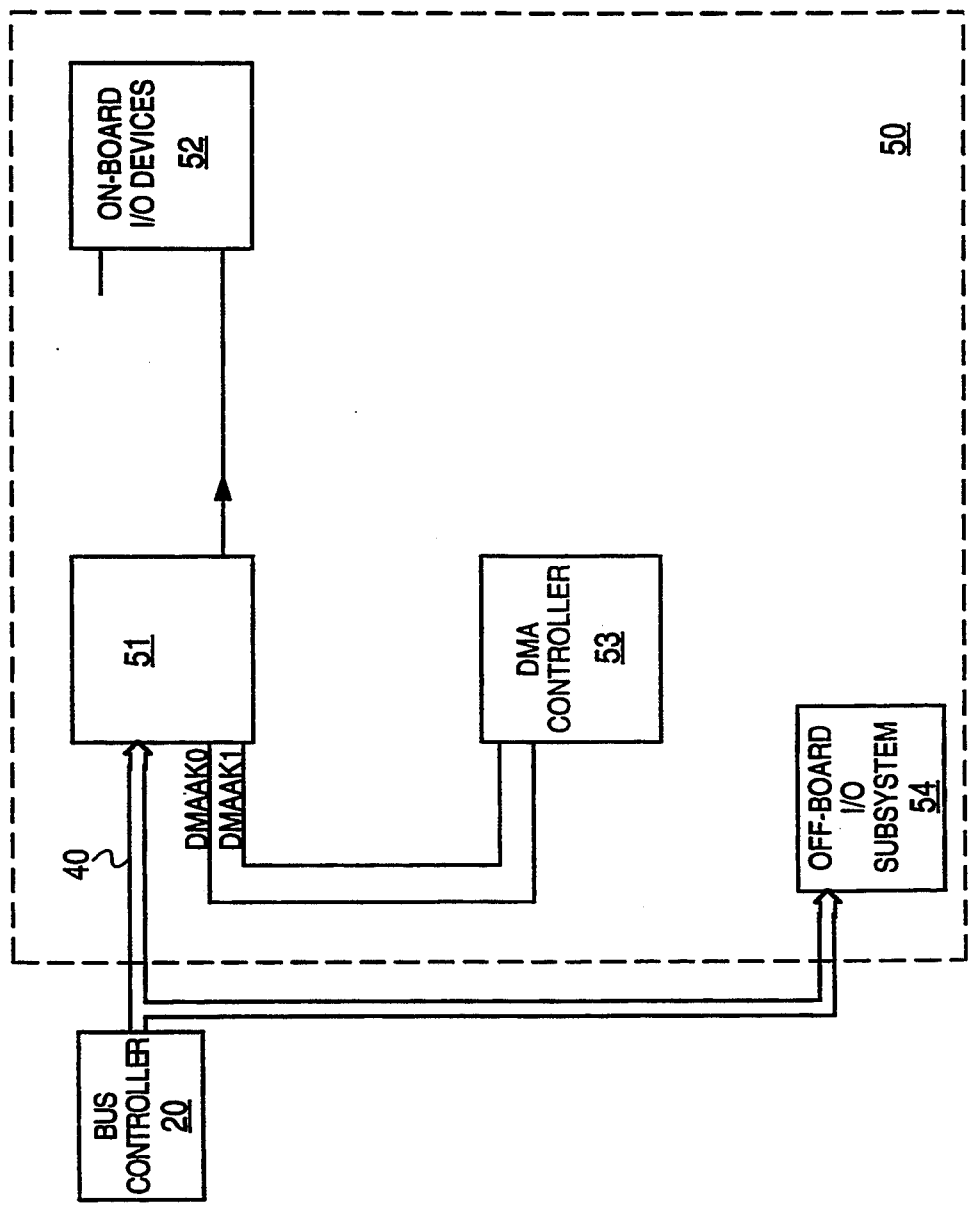
FIG. 16 shows a block diagram of an I/O subsystem of the embodiment of FIGS. 8, 9, 10.

The I/O subsystem 50, FIGS. 7, 16, comprises an I/O control circuit 51, a DMA controller 53, on-board I/O devices 52, and an off-board I/O subsystem 54 which in turn may contain other I/O devices (not shown). I/O control circuit 51 accepts control signals 40 from bus controller 20 (FIG. 6), DMA acknowledge lines DMAAK0 and DMAAK1 from DMA controller 53, and other input as described below, and produces control signals for on-board I/O devices 52.

FIG. 9 shows a schematic of part of I/O subsystem 50, including I/O control circuit 51 and on-board I/O devices 52. On-board I/O devices 52 include a serial controller 18 (NEC chip μPD72001) and other peripheral devices. The interface between microprocessor 1 and the peripheral devices will be explained on the example of the serial controller 18 which is described, for example, in NEC *Microcomputer Products-Microprocessors, Peripherals, & DSP Products,* Vol. 2, 1987 incorporated herein by reference.

I/O control circuit 51 in this example consists of an I/O decode chip 8 and a PLD 13. I/O decode chip 8 is implemented by a programmable array logic device 20L8, and PLD 13 is implemented by a programmable array logic device 16L8, both available from AMD corporation and well known in the art.

I/O decode chip 8 accepts the following inputs:

IORD, IOWR, ST1—three of the control signals 40 from bus controller 20.

BA2–BA9—latched address lines from address latch 6. These lines identify the I/O device for the current I/O operation.

LM/IO, LBS1—latched versions of M/IO and BUSST1, respectively. Latched by address latch 3 (FIG. 8).

DMAAK0, DMAAK1—DMA acknowledge lines from DMA controller 53, FIG. 16.

I/O decode chip 8 is programmed to generate chip select signals to the on-board I/O devices 52. (A chip select signal of a device enables that device to perform an I/O operation.) In addition, I/O decode chip 8 generates a signal IOWAIT. IOWAIT is asserted during cycles accessing on-board I/O devices 52 and is deasserted during all other bus cycles. IOWAIT is used in connection with $\overline{READY}$ generation by memory control circuit 71 as described below.

Note that NEC chip μPD7001 (serial controller 18) does not have a chip select line. Instead, it has RD and WR lines for read and write signals that enable serial controller 18 to read and write, respectively. These lines are connected to I/O decode chip 8 outputs RD72 and WR72, respectively. When latched address lines BA2–BA9 select serial controller 18, I/O decode chip 8 determines from IORD, IOWR whether reading or writing is to be performed and generates the read and write signals on RD72, WR72 as needed.

Some embodiments may contain an I/O device that requires chip select signal timing which cannot be provided by IORD and IOWR. To accommodate such a device, I/O decode chip 8 can be programmed to generate an appropriate chip select signal directly from control signals ST0 and/or ST1 of bus controller 20. In the embodiment of FIG. 9, I/O decode chip 8 uses ST1 to generate such a chip select signal for chip 14, a programmable timer 8254 well known in the art.

The I/O subsystem 50 in FIG. 9 uses PLD 13 to generate other control signals for on-board I/O devices 52. In particular, PLD 13 accepts as inputs DMA acknowledge lines DMAAK0 and DMAAK1 from DMA controller 53 and generates output signals PRI, PA1, and PA0 used as control input signals $\overline{PRI}$, B/A, and C/$\overline{D}$, respectively, for serial controller 18, so that serial controller 18 can be used with DMA. (DMA, Direct Memory Access, is a mode of operation in which an I/O device such as serial controller 18 writes to or reads from memory directly as opposed to writing to or reading from microprocessor 1 and then having microprocessor 1 write to or read from memory.)

Output pin 13 of PLD 13 is connected to input line BS8/$\overline{BS16}$ of microprocessor 1, FIG. 8. Input line BS8/$\overline{BS16}$ informs microprocessor 1 whether, in the current bus cycle, the data bus is 16-bit wide, i.e. it consists of all the 16 lines $D_0$–$D_{15}$, or 8-bit wide, i.e. consists of only 8 lines $D_0$–$D_7$. In the latter case, microprocessor 1 will read data from or write data to $D_0$–$D_7$ only. When the line $\overline{BS8}$/BS16 is high, the data bus is 16-bit wide. When the line $\overline{BS8}$/BS16 is low, the data bus is 8-bit wide. See μPD70136 (V33) 16-bit Microprocessors: High-Speed, CMOS, supra.

PLD 13 is programmed to generate a signal on its pin 13 from its input signals on pins 1, 2 and 3. Pin 1 is connected to an output (not shown) of the I/O decode chip 8. During bus cycles accessing on-board I/O devices 52, I/O decode chip 8 generates on pin 1 an appropriate signal for the microprocessor 1 line BS8/$\overline{BS16}$, i.e. it sets pin 1 high if the data bus must be 16-bit wide, and low if it must be 8-bit wide. During all other bus cycles, I/O decode chip 8 keeps pin 1 low. Pin 2 is connected to an output (not shown) of memory subsystem 70. During bus cycles accessing memory subsystem 70, memory subsystem 70 generates on pin 2 an appropriate signal for line BS8/$\overline{BS16}$ -high for a 16-bit wide data bus, low for an 8-bit wide data bus. During all other bus cycles, memory subsystem 70 keeps pin 1 low. Pin 3 is kept low (by being connected to a pull-up resistor (not shown)) all the time in this embodiment. It could be used in other embodiments by other devices to generate a signal for line BS8/$\overline{BS16}$.

PLD 13 is programmed to produce on its output pin 13 the logical OR of the inputs on its pins 1, 2 and 3. As a result, if at least one of pins 1, 2 and 3 is high, line BS8/$\overline{BS16}$ of microprocessor 1 will be high, and microprocessor 1 will treat its data bus as being 16-bit wide. If all the pins 1, 2 and 3 are low, line BS8/$\overline{BS16}$ will be low, and microprocessor 1 will treat its data bus as being 8-bit wide.

Methods of programming I/O decode chip 8 and PLD 13 to provide the functionality described above are well known in the art.

The I/O subsystem 50 of FIG. 9 uses buffered address lines BA0–BA19 and buffered status lines LM/IO and LBS1 rather than their unbuffered versions. As a result, the I/O subsystem 50 itself does not have to latch those lines. Using the buffered signals is possible because assertion of $\overline{IORD}$ and $\overline{IOWR}$ is delayed by bus controller 20 until transition to state S1, by which time the address and status lines have already been latched by address latches 3, 6, and 9. This delay in asserting $\overline{IORD}$ and $\overline{IOWR}$ is acceptable in most applications, since the I/O interface will usually require at least one wait state. Using chip 74AC373 (approx. 10 ns delay, see Fairchild FACT Logic Data Book, 1985) for address latches 3, 6, and 9 leaves more than 40 ns of address decode time available.

Memory Interface

Figure 17:
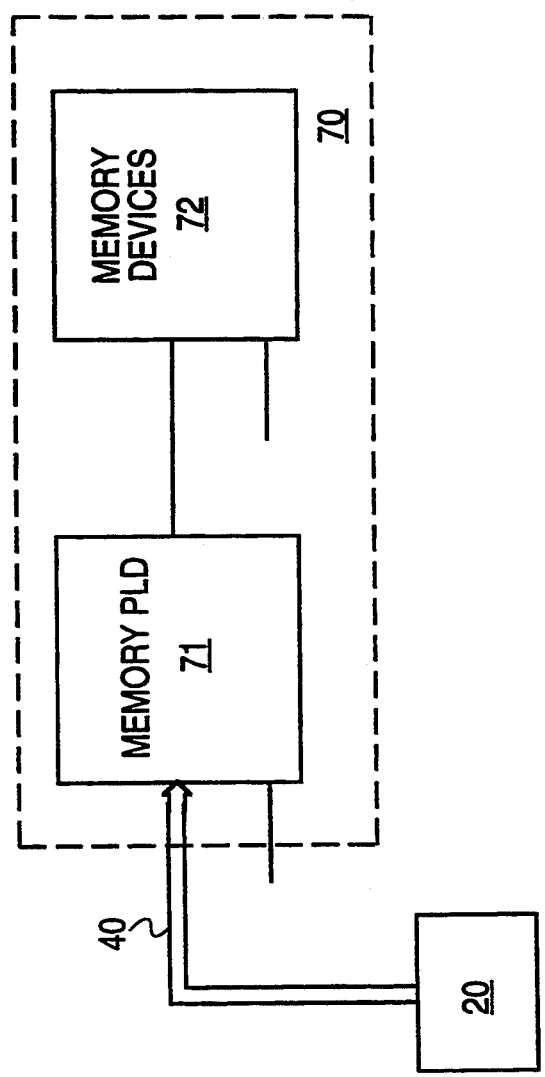
FIG. 17 shows a block diagram of a memory subsystem of the embodiment of FIGS. 8, 9, 10.

The memory subsystem 70, FIGS. 7, 17, comprises a memory control circuit 71 and memory devices 72. Memory control circuit 71 accepts control signals 40 from bus controller 20 (FIG. 6) and some other input as described below, and produces control signals for memory devices 72.

FIG. 10 shows a schematic of a preferred embodiment of memory subsystem 70. Memory control circuit 71 is implemented by a PLD. Memory devices 72 include RAM devices 4, 7, 10 and 12 and an EPROM device 5. Each of RAM devices 4, 7, 10 and 12 is implemented by a RAM chip 4362, and EPROM device 5 is implemented by an EPROM chip 27512, both well known in the art.

Inputs of memory control circuit 71 include:

$A_0$, $A_{15}$–$A_{23}$—unbuffered address lines from microprocessor 1;

M/$\overline{\text{IO}}$, $\overline{\text{UBE}}$ from microprocessor 1;

AEN/$\overline{\text{DEN}}$—one of control signals 40 from bus controller 20;

WC0_IN, WC1_IN—number of wait states. Generated by off-board I/O subsystem 54 (FIG. 16) as described below;

IOWAIT—generated by I/O decode chip 8 (FIG. 9) as described below.

From these and some other inputs, memory control circuit 71 generates:

chip select signals for memory devices 72; and

WC0, WC1—number of wait states—input to Ready/Clock generator 25.

The unbuffered address lines $A_0$, $A_{15}$–$A_{23}$ and status lines $\overline{\text{UBE}}$ from microprocessor 1 are placed directly into memory control circuit 71. Using the unbuffered lines allows the greatest possible address decode time (22.5 ns). If buffered address and status lines are used instead by memory control circuit 71, then the delay of address latches 3, 6 and 9 must be subtracted from the available address decode time.

RAM chips 4, 7, 10 and 12 and EPROM chip 5 are connected to data bus $D_0$–$D_{15}$ through lines BD0–BD15 and data buffers 16 and 19. Each RAM chip is connected to 4 data lines only:

RAM chip 4—to lines $D_0$–$D_3$ (through lines BD0–BD3);

RAM chip 7—to lines $D_4$–$D_7$ (through lines BD4–BD7);

RAM chip 10—to lines $D_8$–$D_{11}$ (through lines BD8–BD11);

RAM chip 12—to lines $D_{12}$–$D_{15}$ (through lines BD12–BD15).

EPROM chip 5 is connected to 8 data lines $D_0$–$D_7$ (through lines BD0–BD7).

Each of the RAM chips 4, 7, 10 and 12 accepts as input:

BA1–BA14, buffered address lines from microprocessor 1 (through address latches 3, 6 and 9). These buffered address lines select 4 bits in the RAM chip to connect to the 4 corresponding data lines (data lines BD0–BD3 for RAM chip 4, BD4–BD7 for RAM chip 7, BD8–BD11 for RAM chip 10, and BD12–BD15 for RAM chip 12).

$\overline{\text{CS}}$ (chip select pin 10 of each RAM chip; when low, enables the chip) is connected to an output pin of memory control circuit 71 as follows:

$\overline{\text{CS}}$ of RAM chips 4 and 7—to RAMCS_L (pin 20) of memory control circuit 71;

$\overline{\text{CS}}$ of RAM chips 10 and 12—to RAMCS_H (pin 21) of memory control circuit 71.

$\overline{\text{WE}}$ (write enable pin 12 of each RAM chip; when low enables the chip to read from the corresponding data lines) is connected to the $\overline{\text{MWR}}$ signal from bus controller 20.

EPROM chip 5 accepts the following input:

BA0–BA15—buffered address lines from microprocessor 1 (through address latches 3, 6 and 9). They select 8 bits in EPROM chip 5 to connect to the 8 data lines BD0–BD7.

$\overline{\text{CE}}$ (chip enable pin 20 of EPROM chip 5; when low, enables the chip) is connected to ROM_CS (pin 17) of memory control circuit 71.

$\overline{\text{OE}}$ (output enable pin 22 of EPROM chip 5; when low, enables output onto BD0–BD7) is connected to the $\overline{\text{MRD}}$ signal from bus controller 20.

Memory subsystem 70 operates as follows. The address line $A_0$ and the status line $\overline{\text{UBE}}$ are outputs of microprocessor 1 which determine whether microprocessor 1 will access, during the current bus cycle, the whole data bus $D_0$–$D_{15}$, only its lower half $D_0$–$D_7$, or only its upper half $D_8$–$D_{15}$, according to the following table:

TABLE 3

| $\overline{\text{UBE}}$ | A0 | Access |
|---|---|---|
| 0 | 0 | $D_0$–$D_{15}$ |
| 0 | 1 | $D_8$–$D_{15}$ |
| 1 | 0 | $D_0$–$D_7$ |
| 1 | 1 | Not used |

The high level of status line M/$\overline{\text{IO}}$ indicates to memory control circuit 71 that memory is being accessed. Address lines $A_0$, $A_{15}$–$A_{23}$ indicate to memory control circuit 71 whether RAM or EPROM is being accessed. $A_0$ and $\overline{\text{UBE}}$ indicate whether the whole data bus $D_0$–$D_{15}$, only $D_0$–$D_7$ or only $D_8$–$D_{15}$ are being accessed. If RAM is accessed, then if the whole $D_0$–$D_{15}$ is accessed, memory control circuit 71 asserts both RAMCS_H and RAMCS_L low thus selecting all the RAM chips 4, 7, 10 and 12;

if only $D_0$–$D_7$ is accessed, memory control circuit 71 asserts RAMCS_L low and keeps RAMCS_H high, thus selecting only RAM chip 4 connected to BD0–BD3 and RAM chip 7 connected to BD4–BD7;

if only $D_8$–$D_{15}$ is accessed, memory control circuit 71 asserts RAMCS_H low and keeps RAMCS_L high thus selecting only RAM chip 10 connected to BD8–BD11 and RAM chip 12 connected to BD12–BD15.

At the same time, if the bus cycle is a memory write cycle, bus controller 20 asserts $\overline{\text{MWR}}$ low thus driving pins $\overline{\text{WE}}$ of the RAM chips low and thereby enabling the RAM chips selected by their $\overline{\text{CS}}$ pins to read data from the corresponding data lines.

If EPROM is being accessed, then memory control circuit 71 asserts its ROM_CS output low thus driving the $\overline{\text{CE}}$ pin of EPROM chip 5 low and so enabling EPROM chip 5. At the same time, if the bus cycle is a memory read cycle (note that EPROM is read only memory), then bus controller 20 asserts its line $\overline{\text{MRD}}$ thus driving pin $\overline{\text{OE}}$ of EPROM chip 5 low and thereby enabling EPROM chip 5 to write data onto the data lines BD0–BD7. Note that EPROM 5 is not connected to data lines $D_8$–$D_{15}$ of microprocessor 1. When EPROM 5 is accessed, line $\overline{\text{BS8}}$/BS16 of microprocessor 1 must be asserted low to inform microprocessor 1 that its data bus is 8-bit wide. This construction allows to use only one EPROM 27512 (as opposed to using two EPROMs, one for $D_0$–$D_7$ and one for $D_8$–$D_{15}$).

Since the inputs $A_{15}$–$A_{23}$, M/$\overline{\text{IO}}$, and $\overline{\text{UBE}}$ of memory control circuit 71 are unbuffered, its chip select outputs ROM_CS, RAMCS_H and RAMCS_L must be latched to guarantee that they will hold their values until the end of the current memory operation. The chip selects are latched inside the memory control circuit 71 using feedback to provide an asynchronous transparent latch. The operation of the latch is such that when AEN/$\overline{\text{DEN}}$ is high the latch is open (transparent), and when AEN/$\overline{\text{DEN}}$ goes low the latch is closed and the chip selects hold their values.

Asynchronous latching can be performed by any PLD that has internal feedback lines from the outputs. In this case, users must be careful not to assign chip select lines to outputs which do not have internal feedback. The PLD equations for memory control circuit 71 can easily be obtained by a person reasonably skilled in the art. For example, the following equations can be used for the output ROM_CS (using "ABEL" assembler format):

memaddr=[A19,A18,A17,A16,A15]
ROM=(memaddr==[H,H,H,H,H])& M/$\overline{IO}$
!ROM_CS=(ROM & AEN_DEN) #(!ROM_CS & !AEN_DEN) #(ROM & !ROM_CS)

Notes: !=not (inverse), #=logical OR, &=logical AND

The term (ROM & !ROM_CS) is redundant and is included to help prevent glitching. Care must be taken that the assembler does not eliminate this term, i.e. lower levels of logic reduction may be required (check assembler documentation).

Memory control circuit 71 also generates, on its output lines WC0, WC1, the number of wait states to be inserted into the current bus cycle. WC0, WC1 are inputs to Ready/Clock generator 25 (FIG. 8). Memory control circuit generates WC0, WC1 for both I/O bus cycles (i.e. bus cycles of the I/O read and the I/O write groups) and memory bus cycles (i.e. bus cycles of the memory read and the memory write groups). Memory control circuit 71 determines from M/$\overline{IO}$ if the current cycle is memory or I/O and generates WC0, WC1 according to the following requirements of this embodiment.

Bus cycles accessing RAM chips 4, 7, 10 and 12 require zero wait states.

Bus cycles accessing EPROM chip 5 require one wait state.

Bus cycles accessing on-board I/O devices 52 require two wait states. Bus cycles accessing off-board I/O subsystem 54 may require any number of wait states between 0 and 3, and during these bus cycles, the off-board I/O subsystem 54 must provide the required number of wait states on inputs WC0_IN, WC1_IN of memory control circuit 71. Memory control circuit 71 sets, during these cycles, WC0=WC0_IN, WC1=WC1_IN. Memory control circuit 71 recognizes cycles accessing on-board I/O devices 52 from cycles accessing off-board I/O subsystem 54 by IOWAIT which is asserted by I/O decode chip 8 (FIG. 9) only during cycles accessing on-board I/O devices 52.

PLDs like that implementing memory control circuit 71 and methods of their programming to provide the functionality described above are well known in the art.

Floating Point Processor Interface

In the embodiment of FIG. 8, floating point subsystem 90 is implemented by an NEC floating point processor AFPP (Advanced Floating Point Processor) also known as μPD72291. Processor AFPP is described in the AFPP User Manual available from NEC. Processor AFPP is a very high performance floating point processor that has been designed to be used with the V33 microprocessor (and the V53 microprocessor). It is connected directly to the V33 microprocessor 1 data bus $D_0$–$D_{15}$. Coprocessor read and write cycles are two bus states each and coprocessor data read ,and write cycles are three bus states each. The connection of processor AFPP to microprocessor 1 is shown in FIG. 8.

Figure 18:
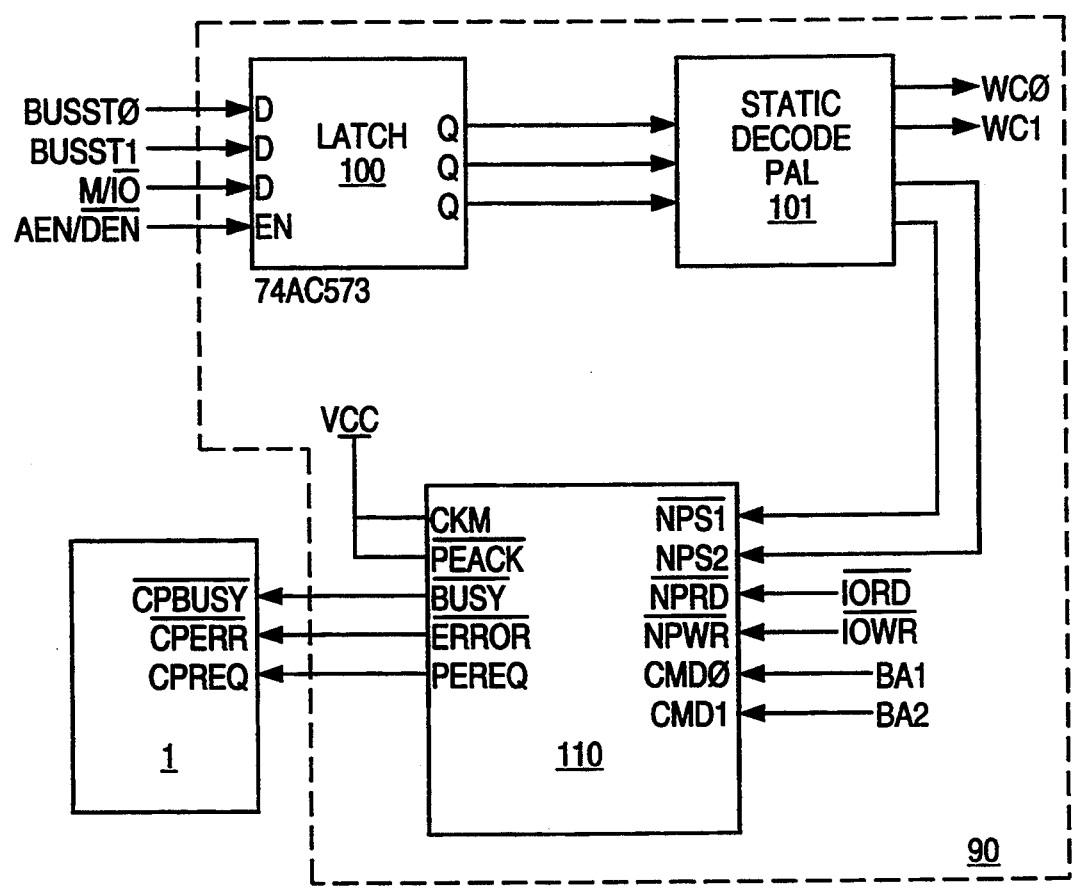
FIG. 18 presents a block diagram of a floating point subsystem according to one embodiment.

FIG. 18 illustrates another embodiment of the floating point subsystem 90. Here the floating point subsystem 90 includes INTEL 80287 numeric processor extension 110, a latch 100, and a static decode PLD 101. Latch 100 is a chip 74AC573 well-known in the art. PLDs like static decode PLD 101 are also well-known in the art. INTEL 80287 numeric processor extension is described in 80287 80-BIT HMOS NUMERIC PROCESSOR EXTENSION (80287-3, 80287-6, 80287-8, 80287-10) available from INTEL corporation, 3065 Bowers Ave., Santa Clara, Calif. 95051. This publication is incorporated herein by reference. How to connect 80287 numeric processor extension to a V33 microprocessor is described in V33 System Design Application Note (August 1989) available from NEC and incorporated herein by reference.

In FIG. 18, Lines $\overline{CPBUSY}$, $\overline{CPERR}$ and CPREQ of microprocessor 1 are connected the lines $\overline{BUSY}$, $\overline{ERROR}$ and PEREQ of 80287 numeric processor extension 110 respectively. Lines CKM and $\overline{PEACK}$ of 80287 numeric processor extension 110 are connected to a voltage supply $V_{cc}$ (about 5V; see 80287 80-BIT HMOS NUMERIC PROCESSOR EXTENSION (80287-3, 80287-6, 80287-8, 80287-10), supra, for more details). Lines $\overline{NPRD}$ and $\overline{NPWR}$ of 80287 numeric processor extension 110 are connected to bus controller 20 outputs $\overline{IORD}$ and $\overline{IOWR}$ respectively. Lines CMD0 and CMD1 are connected, respectively, to latched address lines BA1, BA2 from address latches 3 and 6, respectively.

On reset, microprocessor 1 samples its $\overline{CPBUSY}$ and $\overline{CPERR}$ lines to determine if a coprocessor is attached and if the attached coprocessor is a processor AFPP or an 80287 numeric processor extension. Microprocessor 1 needs to differentiate a processor AFPP from an 80287 numeric processor extension because the processor AFPP "handshake" signals and software interface are entirely different from those of the 80287 numeric processor extension. The processor AFPP is NOT software compatible with the 80287 numeric processor extension. On reset, the $\overline{CPBUSY}$ line is low if a coprocessor is attached, in which case microprocessor 1 samples the $\overline{CPERR}$ line (all during the reset state) to determine whether the attached coprocessor is a processor AFPP or an 80287 numeric processor extension. Listed below are the possible values of $\overline{CPBUSY}$ and $\overline{CPERR}$ and their meanings.

TABLE 4

| $\overline{CPBUSY}$ | $\overline{CPERR}$ |
|---|---|
| 1 - no coprocessor attached | 1 - AFPP utilized |
| 0 - coprocessor attached | 0 - i80287 utilized |

Line $\overline{NPS1}$, NPS2 of 80287 numeric processor extension 110 effectively serve as chip select inputs enabling 80287 numeric processor extension 110. Lines CMD0, CMD1 select internal registers of numeric processor extension 110. Numeric processor extension 110 is synchronized by its own clock (not shown) that does not have to be synchronous with the microprocessor 1 processor clock CLK.

Bus controller 20 asserts $\overline{IORD}$ or $\overline{IOWR}$ in coprocessor bus cycles (i.e. coprocessor read, coprocessor write, coprocessor data read, and coprocessor data write cycles) as needed. During coprocessor cycles, I/O decode chip 8 disables chip selects of on-board I/O devices 52 which eliminates the possibility of bus contention.

As shown in FIG. 18, each of microprocessor 1 status lines BUSST0, BUSST1, and M/$\overline{IO}$ is connected to a D input of latch 100. Output signal AEN/$\overline{DEN}$ of bus controller 20 is connected to the EN input of latch 100. AEN/$\overline{\text{DEN}}$, when high, enables the three D inputs of latch 100, and when low, disables those inputs so that latch 100 latches the signals on those inputs and maintains them on its three Q outputs. These latched signals are inputs to static decode PLD 101 which is programmed to generate, from these inputs, signals WC0 and WC1 for Ready/Clock generator 25 and $\overline{\text{NPS1}}$, NPS2 for numeric processor extension 110.

Chips like static decode PLD 101 and methods of their programming to provide the functionality described above are well known in the art.

Figure 19:
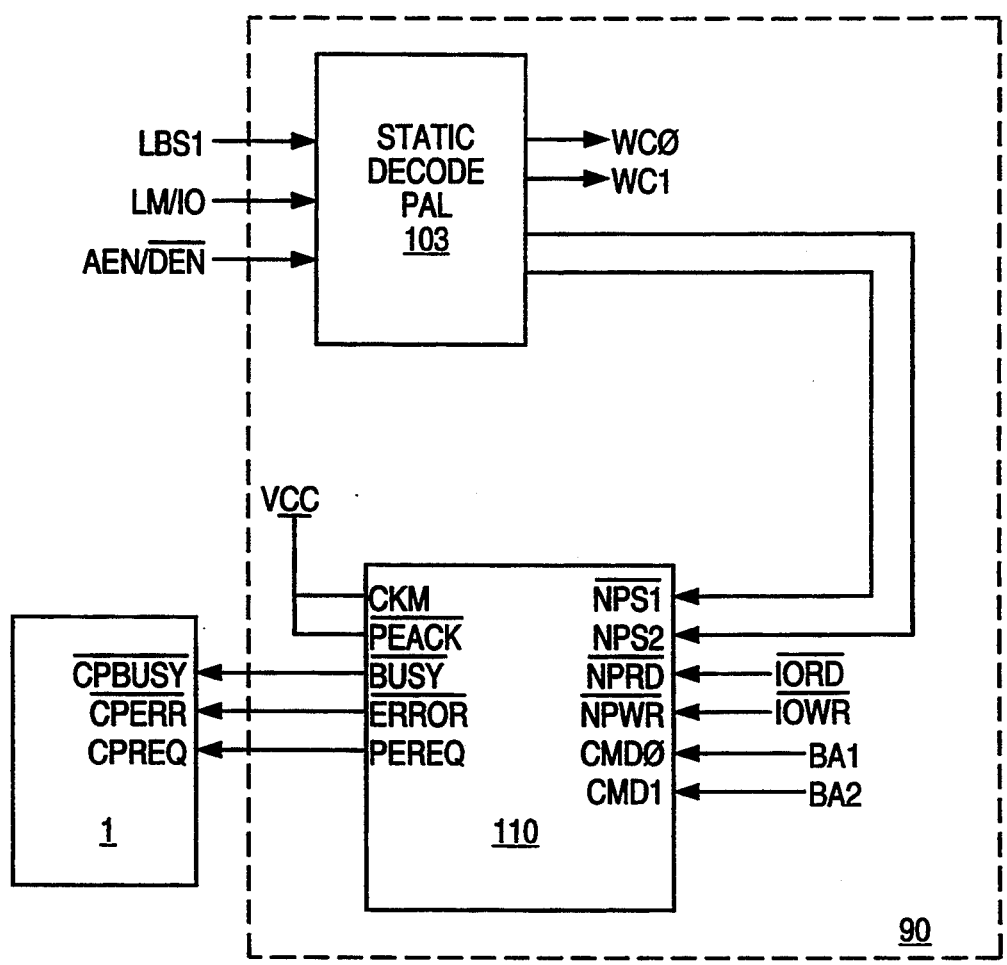
FIG. 19 presents a block diagram of a floating point subsystem according to another embodiment.

FIG. 19 illustrates another embodiment of the floating point subsystem 90. This embodiment is similar to that of FIG. 18, but it does not have latch 100 and it does not latch status lines of microprocessor 1. Instead, it uses the status lines latched versions LBS1, LM/$\overline{\text{IO}}$ latched by address latch 3. LBS1 (latched version of BUSST1), LM/$\overline{\text{IO}}$ (latched version of M/$\overline{\text{IO}}$) and bus controller 20 output signal AEN/$\overline{\text{DEN}}$ are inputs to a static decode PLD 103. Static decode PLD 103 is programmed to produce, from these inputs, outputs WC0, WC1 for Ready/Clock generator 25 and $\overline{\text{NPS1}}$, NPS2 for numeric processor extension 110.

BUSST0 is not an input to static decode PLD 103. As a result, numeric processor extension 110 gets selected during HALT acknowledge cycles. This is because the status lines M/$\overline{\text{IO}}$, R/$\overline{\text{W}}$ and BUSST1 have the same values during HALT acknowledge cycles and coprocessor write cycles (the values are 0, 0 and 1 respectively; see Table 1 above), so static decode PLD 103 does not differentiate between HALT acknowledge cycles and coprocessor write cycles and generates signals $\overline{\text{NPS1}}$, NPS2 to select numeric processor extension 110 during both types of cycles (rather than during coprocessor write cycles only). But this is not objectionable in most applications.

Chips like static decode PLD 103 and methods of their programming to provide the functionality described above are well known in the art.

Figure 20:
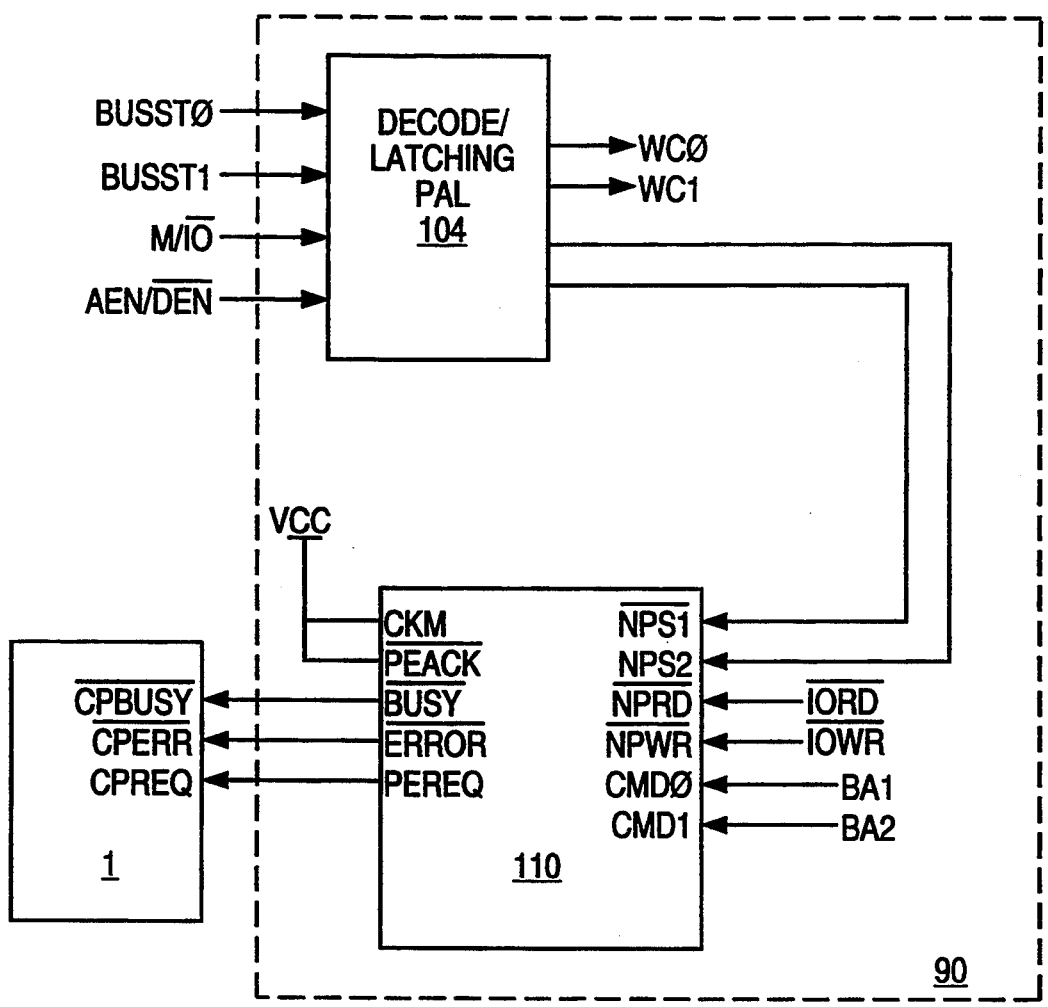
FIG. 20 presents a block diagram of a floating point subsystem according to a third embodiment.

FIG. 20 illustrates one more embodiment of the floating point subsystem 90. This embodiment is also similar to that of FIG. 18, but here decode/latching PLD 104 performs both the latching function of latch 100 and the function of static decode PLD 101 of FIG. 18.

Chips like decode/latching PLD 104 and methods of their programming to provide the functionality described above are well known in the art.

The present invention is not limited to the embodiments described above. Other embodiments of the external circuitry 30 may be created to operate with microprocessor 1, bus controller 20, and Ready/Clock generator 25. Furthermore, bus controller 20 can be modified to generate different control signals as required by a particular implementation of the external circuitry 30 without departing from the spirit of this invention. Also, bus controller 20 outputs ST0, ST1 may be used by external circuitry 30 to create other control signals as needed by external circuitry 30. Ready/Clock generator 25 can also be modified without departing from the spirit of this invention. For example, other embodiments of Ready/Clock generator 25 may use only one of signals XRDY1, XRDY2, no such signals, or more than two such signals to override the signals WC2, WC1, WC0. Furthermore, more than three input lines such as lines WC2, WC1, and WC0 may be used to allow more than seven wait states to be inserted into a bus cycle of microprocessor 1. The counter implemented by Ready/Clock generator 25 may count not from the number of wait states down to zero but, say, from 1 up to the number of wait states or according to some other scheme. Also, Ready/Clock generator 25 and bus controller 20 may be implemented by, say, one PLD chip, three PLD chips, or any other number of PLD chips. For example, the clock generator function of Ready/Clock generator 25 may be implemented by a separate PLD chip. Many other variations of this invention are and will be obvious to persons of ordinary skill in the art.

What is claimed is:

1. A computer system comprising:
    a microprocessor providing address information and information about a start and type of its bus cycle;
    a memory:
    a latch for controllably latching said address information and for providing latched address information:
    a bus controller responsive to said bus cycle information and to a processor clock, for asserting a first signal indicating said address information provided by said microprocessor to be valid, wherein said first signal controls said latch so that:
        when said first signal is asserted, said latch latches said microprocessor address information; and
        when said first signal is deasserted, said latch is transparent to said microprocessor address information; and
    a memory control circuit having a first input for receiving said address information in an unlatched condition, a second input for receiving said first signal, and a third input for receiving said bus cycle information, said memory control circuit being responsive to signals at said first, second, and third inputs for providing a second signal for selectively enabling said memory, said memory control circuit further being responsive to the signal at said second input for latching said second signal.

2. A memory control system as in claim 1, further comprising means for electrically connecting a data bus of said microprocessor to said memory in response to said first signal being asserted.

3. The system of claim 1 further comprising:
    a first I/O subsystem having one or more I/O devices: and
    an I/O control circuit responsive to the address and bus cycle information provided by said microprocessor, for selectively enabling said I/O devices, said I/O control circuit asserting a third signal when said microprocessor accesses said first I/O subsystem;
    wherein the memory control circuit further comprises a fourth input for receiving said third signal, and said memory control circuit is responsive to the signals at said first, third and fourth inputs for providing a fourth signal specifying a number of wait states to be inserted into a bus cycle of said microprocessor.

4. A system as in claim 3, wherein said memory control circuit further comprises a fifth input for receiving a signal specifying a number of wait states to be inserted into a bus cycle when said microprocessor accesses a second I/O subsystem, and wherein said memory control circuit is further responsive to the signal at said fifth input for providing said fourth signal.

* * * * *